United States Patent [19]

Oguchi et al.

[11] Patent Number: 5,335,262

[45] Date of Patent: Aug. 2, 1994

[54] RADIO COMMUNICATION ADAPTER CONNECTED TO MOBILE STATION AND MOBILE COMMUNICATION SYSTEM USING THE RADIO COMMUNICATION ADAPTER

[75] Inventors: Takuro Oguchi; Shunroku Sasaki; Masaru Asahara, all of Kawasaki, Japan

[73] Assignee: Fujitsu Limited, Kawasaki, Japan

[21] Appl. No.: 871,412

[22] Filed: Apr. 20, 1992

[30] Foreign Application Priority Data

Apr. 19, 1991 [JP] Japan .................................. 3-087969

[51] Int. Cl.⁵ ..................... H04M 11/00; H04B 7/15; H04B 1/38; H04Q 7/00
[52] U.S. Cl. ......................................... 379/58; 379/59; 379/61; 455/11.1; 455/33.1; 455/89
[58] Field of Search ............................ 379/58, 59, 61; 455/11.1, 33.1, 56.1, 89

[56] References Cited

U.S. PATENT DOCUMENTS

| | | | |
|---|---|---|---|
| 4,636,741 | 1/1987 | Mitzlaff | 455/89 |
| 4,796,291 | 1/1989 | Makino | 455/56.1 |
| 4,980,907 | 12/1990 | Raith et al. | 379/63 |
| 5,048,117 | 9/1991 | Aisaka et al. | 455/89 |
| 5,101,500 | 3/1992 | Marui | 455/56.1 |
| 5,109,526 | 4/1992 | Reed | 455/11.1 |

FOREIGN PATENT DOCUMENTS 0169726  1/1986  European Pat. Off. .
89/04569  5/1989  World Int. Prop. O. .

Primary Examiner—Stephen Chin
Assistant Examiner—Vijay Shankar
Attorney, Agent, or Firm—Staas & Halsey

[57] ABSTRACT

A radio communication adapter is used in a mobile communication system including a first mobile communication network, first mobile stations registered in the first mobile communication network, a second mobile communication network connected to the first mobile communication network, and second mobile stations registered in the second mobile communication network. The radio communication adapter is attached to one of the second mobile stations. The radio communication adapter includes a radio communicating part for communicating, via a radio channel, with the first mobile stations located outside a first service area of the first mobile communication network, and a requesting part for requesting that first identification data of the first mobile stations located outside the first service area is registered, in connection with the second mobile stations, in the first mobile communication network via the above-mentioned one of the second mobile stations and the second mobile communication network.

24 Claims, 23 Drawing Sheets

| PID | REGISTERED POSITION | POSITION REGISTRATION TIME |
|---|---|---|
| 123333 | BS0033 | 3.05.14.00. |
| 123444 | 030-32-XXXXX | 3.05.15.00. |
| ⋮ | ⋮ | ⋮ |

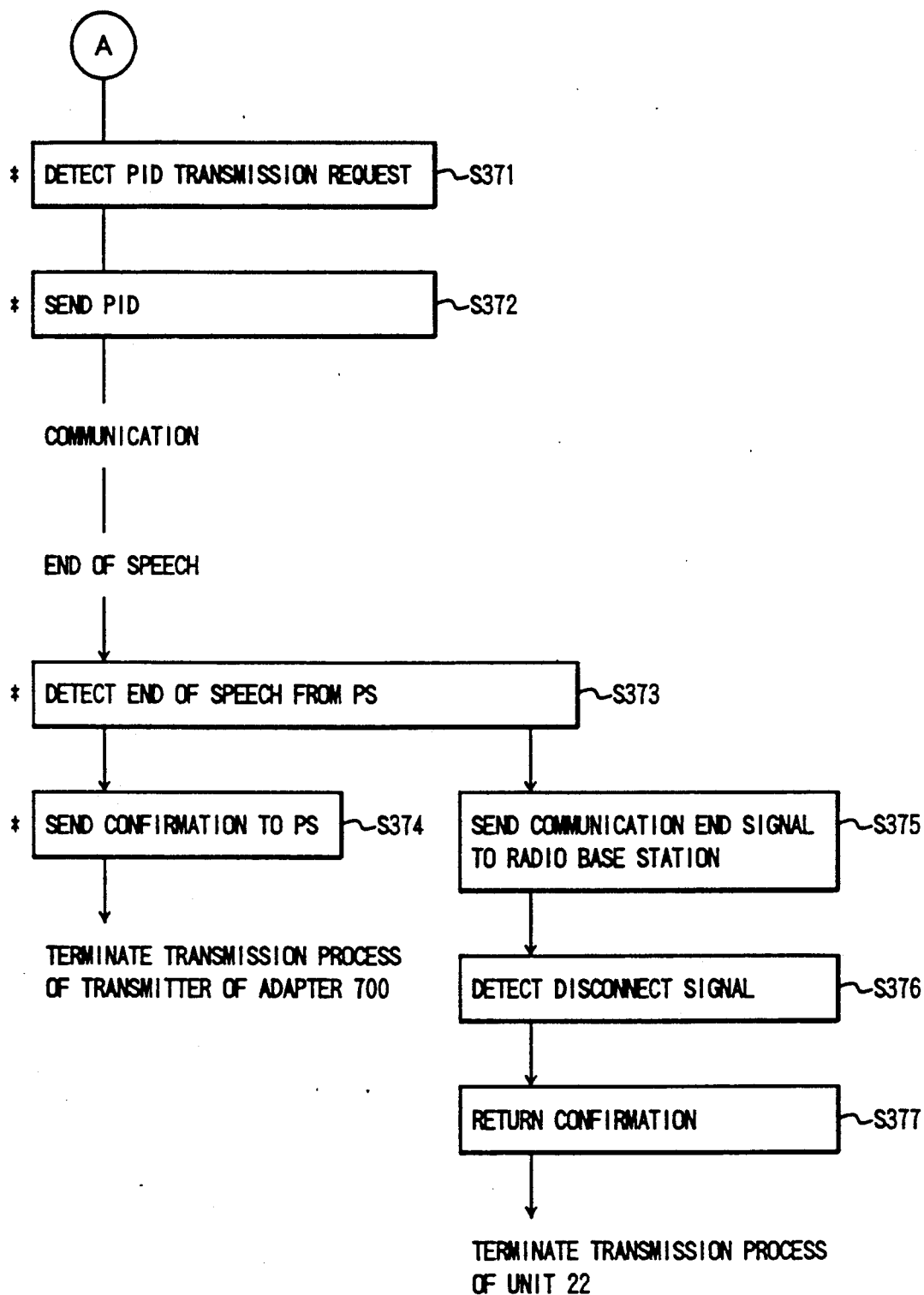

RADIO COMMUNICATION ADAPTER CONNECTED TO MOBILE STATION AND MOBILE COMMUNICATION SYSTEM USING THE RADIO COMMUNICATION ADAPTER

BACKGROUND OF THE INVENTION (1) Field of the Invention

The present invention generally relates to mobile communication systems, such as a portable telephone system and an automobile telephone communication system.

(2) Description of the Prior Art

Generally, a mobile communication system has a communication service area, which may be a single area or divided into a plurality of zones. A mobile station or terminal A in the service area can communicate with another mobile station or terminal B in the service area. However, if the mobile station B moves outside of the service area, the mobile station A will not be able to communicate with the mobile station B. The above situation will take place, if a person places his or her portable telephone (cordless telephone) B in an automobile having an automobile telephone and brings back the portable telephone B to a place (home, for example) located outside the service area. In this case, the communication system cannot identify the position of the portable telephone B. Hence, if a person using the portable telephone A wishes to call out the portable telephone B, the communication system cannot send a call from the portable telephone A to the portable telephone B located outside the service area.

SUMMARY OF THE INVENTION

It is a general object of the present invention to provide a mobile communication system and a radio communication adapter making it possible for a mobile station to communicate with another mobile station located outside the service area.

The above object of the present invention is achieved by a mobile communication system comprising:

a first mobile communication network having a first service area;

first mobile stations having first identification data registered in the first mobile communication network in order to identify positions of the first mobile stations and receive a communication service provided by the first mobile communication network;

a second mobile communication network communicating with the first mobile communication network and having a second service area;

second mobile stations having second identification data registered in the second mobile communication network in order to receive a communication service provided by the second mobile communication network; and radio communication adapter means, connected to the second mobile stations, for coupling, via a radio channel, the first mobile stations located outside the first service area with the second mobile stations, wherein the first identification data of the first mobile stations located outside the first service area are respectively transferred to the radio communication adapter means, the second mobile stations and the second mobile communication network, and registered, in connection with the second mobile stations, in the first communication network.

The above object of the present invention is also achieved by a radio communication adapter used in a mobile communication system including a first mobile communication network, first mobile stations registered in the first mobile communication network, a second mobile communication network connected to the first mobile communication network, and second mobile stations registered in the second mobile communication network, the radio communication adapter being attached to one of the second mobile stations, the radio communication adapter comprising:

radio communicating means for communicating, via a radio channel, with the first mobile stations located outside a first service area of the first mobile communication network: and requesting means for requesting that first identification data of the first mobile stations located outside the first service area is registered, in connection with the second mobile stations, in the first mobile communication network via one of the second mobile stations and the second mobile communication network.

BRIEF DESCRIPTION OF THE DRAWINGS

Other objects, features and advantages of the present invention will become more apparent from the following detailed description when read in conjunction with the accompanying drawings, in which:

FIGS. 19, 20A, 20B and 21 are flowcharts of a process for processing a call generated by a portable telephone located outside the service area of the portable telephone system and addressed to another portable telephone.

DESCRIPTION OF THE PREFERRED EMBODIMENTS

Figure 1:
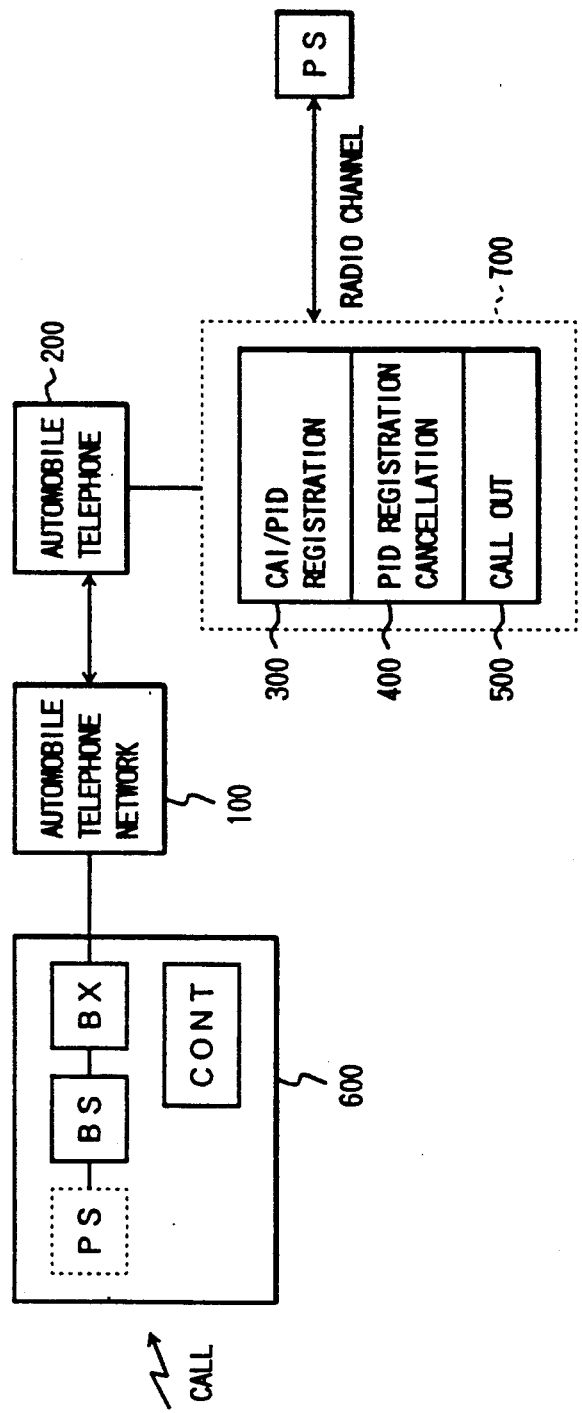
FIG. 1 is a block diagram of an overview of an embodiment of the present invention.

A description will now be given, with reference to FIG. 1, of an overview of an embodiment of the present invention. A mobile communication system shown in FIG. 1 comprises an automobile telephone network 100, an automobile telephone 200, a portable telephone system 600, and a radio communication adapter 700. The adapter 700 is connected to the automobile telephone 200 via signal lines. The adapter 700 comprises a common air interface (radio communication interface) and personal identification number registration function block 300 (hereinafter simply referred to as CAI/PID registration function block 300), a personal identification number registration canceling function block 400 (hereinafter simply referred to as PID registration canceling function block 400), and a call-out function block 500. The portable telephone system 600 comprises an exchange BX, such as a private branch exchange, a line controller CONT, a radio base station BS, and portable telephones PS. Although only one radio base station BS is illustrated for the sake of simplicity, normally a plurality of radio base stations are provided. Likewise, a plurality of portable telephones PS are used.

More specifically, the line controller CONT of the portable telephone system 600 holds information showing in which one of a plurality of service areas of the radio base stations BS each portable telephone PS is located. The line controller CONT receives a call from a portable telephone PS or a normal telephone set (not shown in FIG. ) and investigates the position (area) of a called portable telephone PS. Then, the line controller CONT calls out the addressed portable telephone PS via the radio base station BS in which the called-out portable telephone PS is located.

A predetermined common air interface (radio communication interface) is defined between the portable telephones PS and the radio base stations BS. The same common air interface as described above is defined between the adapter 700 connected to the automobile telephone 200 and a portable telephone PS illustrated on the right side of the drawing. This portable telephone PS is originally registered as a telephone of the portable telephone system 600, but is now located outside the service area thereof. The above radio communication interface between the adapter 700 and the portable telephone PS is realized by the CAI/PID registration function block 300. When the adapter 700 receives a predetermined signal from the portable telephone PS, a radio communication channel is established between the adapter 700 and the portable telephone PS under the control of the function block 300. When the adapter 700 receives a personal identification (telephone) number registration request signal (PID registration request signal) from the portable telephone PS, the adapter 700 automatically sends registration request data, the identification (telephone) number of the automobile telephone 200, and the PID to the line controller CONT of the portable telephone system 600 via the automobile telephone 200 and the automobile telephone network 100. Then, these numbers are registered in the line controller CONT.

When the PID registration canceling function block 400 receives a PID registration canceling request signal from the portable telephone PS, it automatically sends the PID and registration cancellation data to the line controller CONT via the automobile telephone 200 and the automobile telephone network 100. The call-out function block 500 calls out the portable telephone PS every specified time in order to determine whether or not the portable telephone PS is still in the zone of the adapter 700.

It should be noted that the portable telephone PS, which is originally registered as a telephone of the portable telephone system 600 but is now located outside the service area thereof, can communicate with the portable telephone system 600 via the adapter 700, the automobile telephone 200 and the automobile telephone network 100. In the manner as has been described previously, the position of the personal telephone PS located outside the service area of the portable telephone system 600 can be recognized. Hence, if the line controller CONT receives, from a portable telephone PS in the service area, a call addressed to the portable telephone PS located outside the service area, the line controller CONT calls out the destination portable telephone PS via the automobile telephone network 100, the automobile telephone 200, the adapter 700, and the radio channel established between the adapter 700 and the destination portable telephone PS. In this manner, the portable telephone PS can be serviced by the portable telephone system 600 even when it is located outside the service area thereof. It is also possible for the portable telephone PS located outside the service area of the system 600 to call out a portable telephone therein via the reverse of the above-mentioned route.

Figure 2:
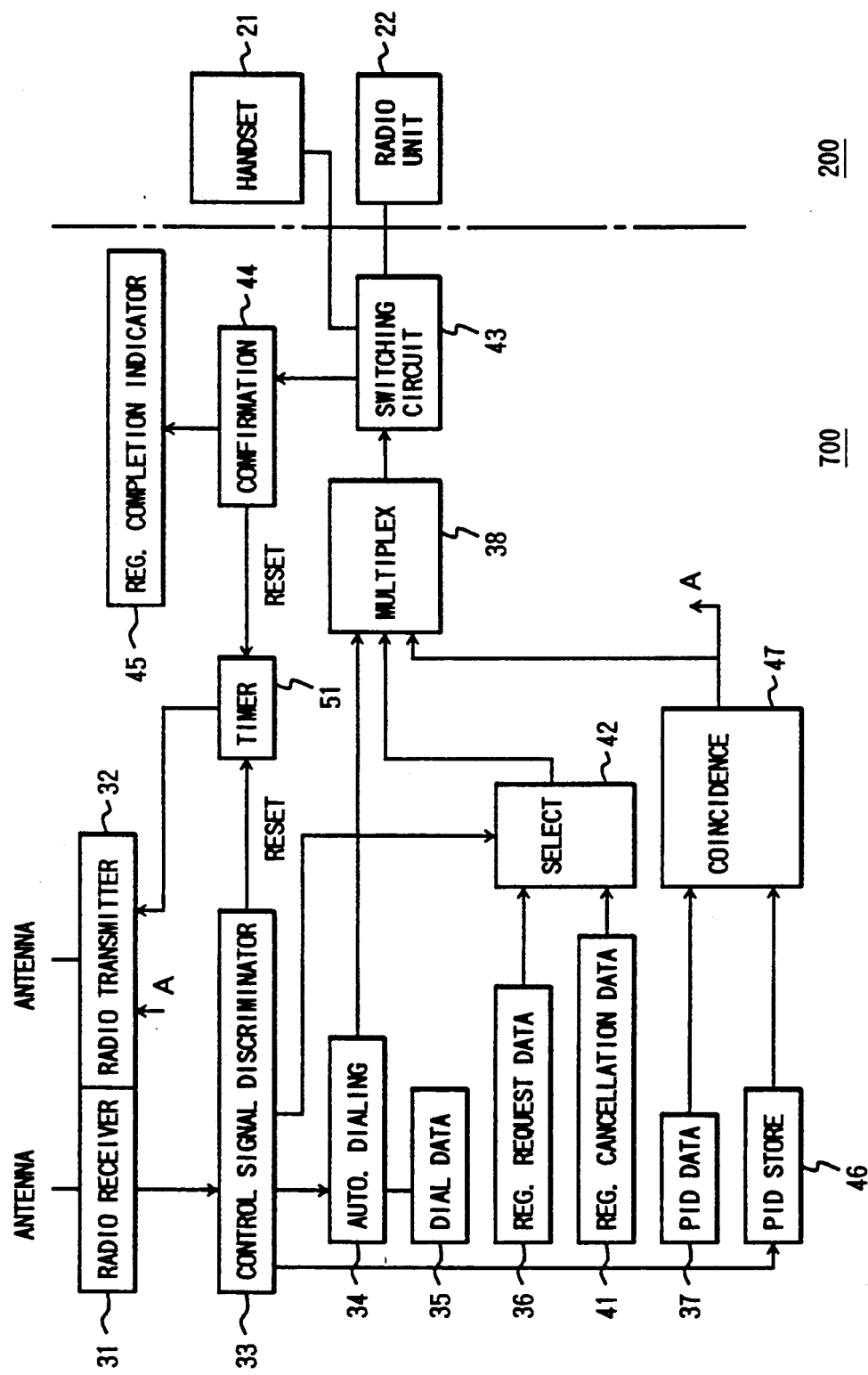
FIG. 2 is a block diagram showing the structure of a radio communication adapter coupled to an automobile telephone.

FIG. 2 shows the structure of the radio communication adapter 700 shown in FIG. 1. The CAI and PID registration function block 300 shown in FIG. 1 comprises a radio receiver 31, a radio transmitter 32, a control signal discriminator 33, an automatic dialing unit 34, a dial data register 35, a registration request data register 36, a PID data register 37, and a signal multiplexer 38. The PID registration canceling function block 400 shown in FIG. 1 comprises a registration canceling data register 41, a selector 42, a switching circuit 43, a center process completion confirmation unit 44, a registration completion indicator 45, a PID memory 46, and a coincidence detector 47. The call-out function block 500 shown in FIG. 1 comprises a timer 51. The adapter 700 is connected to an automobile telephone radio unit 22 of the automobile telephone 200, and a handset 21 thereof. The handset 21 includes a speaker, a microphone and a dialing unit.

Each portable telephone PS in the portable telephone system 600 is assigned a PID. The PID of each portable telephone PS is registered in the line controller CONT of the portable telephone system 600. Normally, a plurality of radio base stations BS are provided. In this case, the PID of each portable telephone PS is registered together with data showing in which one of the service areas respectively provided by the radio base stations each portable telephone PS is located. Further, data showing whether or not each portable telephone PS is busy and accounting information are managed by the line controller CONT. As has been pointed out, only one portable telephone PS and only one radio base station BS are illustrated in FIG. 1. The portable telephones PS in the service areas of the system 600 can communicate with each other via the exchange BX. It will be noted that the exchange BX is, for example, a private branch exchange. In this case, the services areas will cover the whole office or building in which the private branch exchange is installed. Of course, the exchange BX is not limited to being a private branch exchange.

It will be now assumed that a person owns both the automobile telephone 200 and the portable telephone PS, which are now located outside the service areas of the system 600. This situation will occur when the person carrying the portable telephone PS drives the automobile and goes outside the service areas of the system 600. In FIG. 1, a block PS depicted by the broken line means that the portable telephone PS was originally in the system 600, and the block PS depicted by the solid line means that the portable telephone PS is now located outside the service areas of the system 600.

The aforementioned PID registration request signal is generated by the portable telephone PS in response to a predetermined manipulation for position registration, and sent to the adapter 700 in the form of a radio signal. This radio signal is received by the control signal discriminator 33 via an antenna (not shown) and the radio receiver 31. In response to receipt of the received radio signal, the control signal discriminator 33 establishes a radio channel between each of the radio receiver 31 and the radio transmitter 32, and the portable telephone PS. After this, the portable telephone PS located outside the service area of the network 600 sends the adapter 700 its own PID, the position registration request signal and the identification number of a center station including the exchange BX and the line controller CONT of the system 600. These signals are applied to the control signal discriminator 33. Then the control signal discriminator 33 requests, via a control line (not shown for the sake of simplicity), the automobile telephone radio unit 22 to establish a radio channel between the automobile telephone 200 and the automobile telephone network 100. Further, in response to the position registration request, the control signal discriminator 33 outputs a registration request detection signal to the automatic dialing unit 34 and the selector 42.

The dial data register 35 stores the identification number of the center station, which is applied to the automatic dialing unit 34. In response to receipt of the registration request detection signal, the automatic dialing unit 34 automatically dials the center station identification number, which is sent to the system 600 via the signal multiplexer 38, the switching circuit 43, the automobile telephone radio unit 22, and the automobile telephone network 100.

The selector 42 receives the registration request data from the register 36 and the registration canceling data from the register 41. In response to the registration request detection signal from the discriminator 33, the selector 42 selects the register 36. The PID received by the discriminator 33 is output to the PID register 46. The coincidence detector 47 compares the received PID with a predetermined PID registered in the register 37. When it is determined that the received PID has been registered, the PID and the identification (telephone) number of the automobile telephone 200 registered in the register 37 are applied to the signal multiplexer 38. Then, the signal multiplexer 38 sends the PID of the portable telephone PS, the registration request data and the identification number of the automobile telephone 200 to the system 600 via the above-mentioned route.

The line controller CONT of the system 600 receives the above-mentioned signals, and registers the position of the portable telephone PS located outside the service area thereof. More specifically, the PID of the portable telephone PS is registered in connection with the identification number of the automobile telephone 200. After the registration is completed, the line controller CONT sends back a registration completion signal to the adapter 700 via the automobile telephone network 100 and the automobile telephone 200. The registration completion signal passes through the switching circuit 43 and is detected by the center process completion confirmation unit 44, which turns ON the registration completion indicator 45.

In the above-mentioned manner, the registration of the PID of the portable telephone PS located outside the service area of the system 600 is carried out. When the controller CONT of the system 600 receives a call addressed to the portable telephone PS located outside the service area, the controller CONT transfers the received call to the adapter 700 via the automobile telephone network 100 and the automobile telephone 200. The radio transmitter 32 receives the call from the switching circuit 43 via a line (not shown for the sake of simplicity), and transmits it to the portable telephone PS located outside the service area of the system 600.

When the portable telephone PS is returned to the service area of the system 600 from the outside thereof, the following process is carried out. The user of the portable telephone PS manipulates, for example, a key for requesting cancellation of the registration. In response to this key entry, a registration canceling request signal is transmitted. This request signal is received by the control signal discriminator 33, which generates a registration cancellation detection signal. This signal makes the selector 42 select the register 41 in which the registration canceling data is registered, and activates the automatic dialing unit 34. In the same manner as has been described previously, the center station of the system 600 is automatically called out, and the registration canceling data, the PID of the portable station PS and the identification number of the automobile telephone 200 are sent to the system 600. In response to these signals, the controller CONT cancels the registration of the PID of the personal telephone PS in connection with the identification number of the automobile telephone 200.

In addition or instead, it is possible to automatically cancel the registration of the PID in the following manner. The timer 51 starts to operate when the center process completion confirmation unit 44 detects the registration completion signal. When the timer 51 has measured a predetermined time from the commencement of the measurement operation, the radio transmitter 32 calls out the corresponding personal telephone PS. When a response signal from the personal telephone PS is received by the control signal discriminator 33 via the radio receiver 31, the discriminator 33 outputs a reset signal to the timer 51, so that the timer 51 is reset. When no response signal is received, the control signal discriminator 33 makes the selector 42 select the registration canceling data register 41. Then, the registration canceling data is sent to the center station of the personal telephone system 600 in the manner as has been described previously. After the cancellation of the registration of the PID is completed, a cancellation completion signal is output by the line controller CONT of the center station. The cancellation completion signal is received by the control signal discriminator 33, which outputs the reset signal to the timer 51.

The above-mentioned embodiment of the present invention will now be further described.

Figure 3:
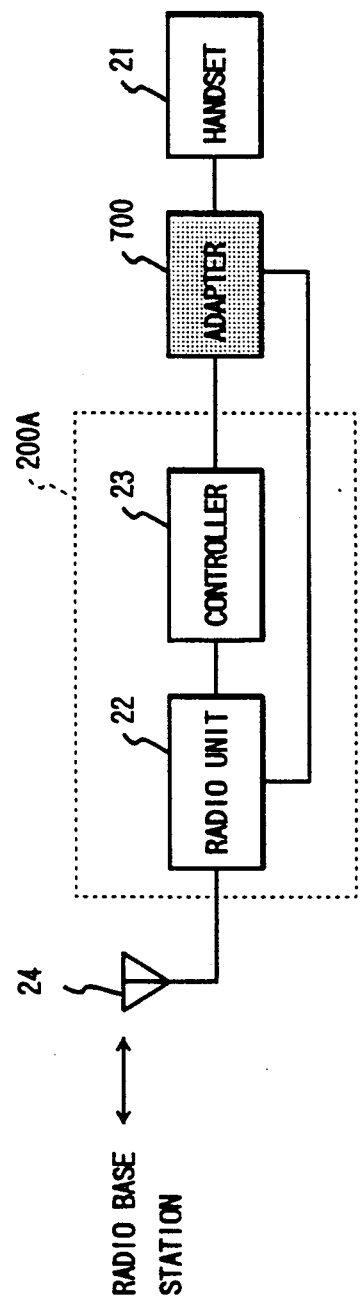
FIG. 3 is a block diagram of an automobile telephone with the adapter attached thereto.

FIG. 3 shows the structure of the automobile telephone 200 with the adapter 700 added thereto. In FIG. 3, those parts which are the same as those shown in the previous figures are given the same reference numerals. The automobile telephone 200 comprises a controller 23 and an antenna 24 in addition to the aforementioned handset 21 and the radio unit 22. The radio unit 22 and the controller 23 form a mobile device block 200A. The adapter 700 is connected to the controller 23 and the handset 22. As has been described previously, the handset 22 includes the speaker, the microphone and the dialing unit including key pads, as will be described in detail later.

Figure 4:
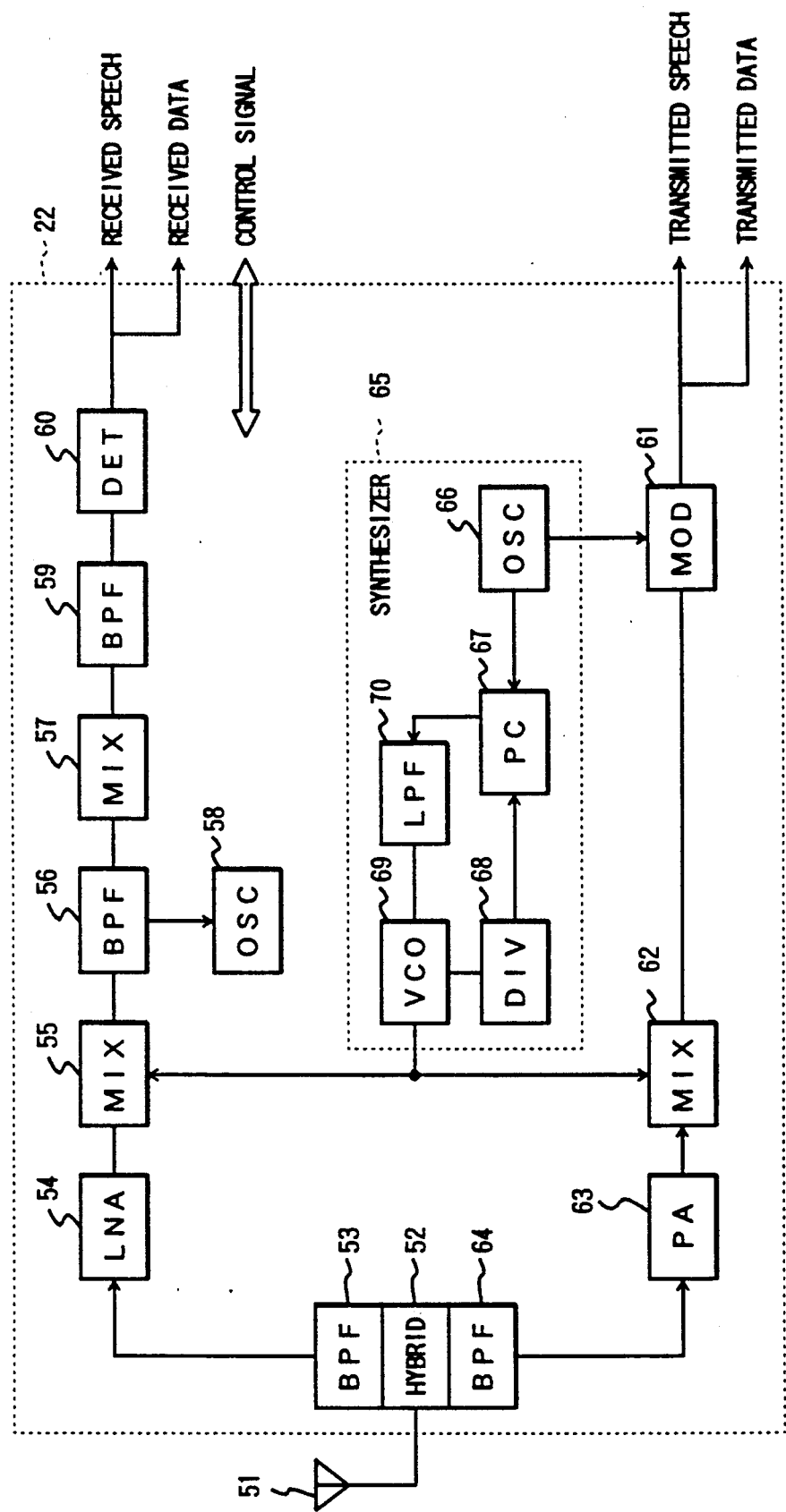
FIG. 4 is a block diagram of a radio unit of the automobile telephone shown in FIG. 3.

FIG. 4 is a block diagram of the radio unit 22 of the automobile telephone 200, which comprises an antenna 51, a transmission system, a reception system, and a synthesizer 65. The transmission system and the reception system are coupled to a hybrid circuit 52. The reception system comprises a band-pass filter (BPF) 53, a low noise amplifier (LNA) 54, a mixer (MIX) 55, a band-pass filter 56, a mixer 57, a band-pass filter 59 and a detector 60, which are connected in this sequence from the input side of the reception system to the output side thereof. A crystal oscillator (OSC) 58 is connected to the mixer 57. A received speech signal and data from detector 60 are output to the controller 23. The transmission system comprises a modulator (MOD) 61, a mixer (MIX) 62, a power amplifier (PA) 63 and a band-pass filter 64, which are arranged in this sequence from the input side of the transmission system to the output side thereof. A transmission signal and data from the controller 23 are applied to the modulator 61.

The synthesizer 65 comprises a crystal oscillator (OSC) 66, a phase comparator (PC) 67, a variable frequency divider 68, a voltage-controlled oscillator (VCO) 69, and a low-pass filter (LPF) 70. That is, the synthesizer 65 comprises a phase-locked loop (PLL) circuit. A signal oscillated by the crystal oscillator 66 is applied to the phase comparator 67 and the modulator 61. A variable-frequency signal generated by the synthesizer 65 is applied to the mixers 55 and 62 in order to selectively use a plurality of radio channels.

Figure 5:
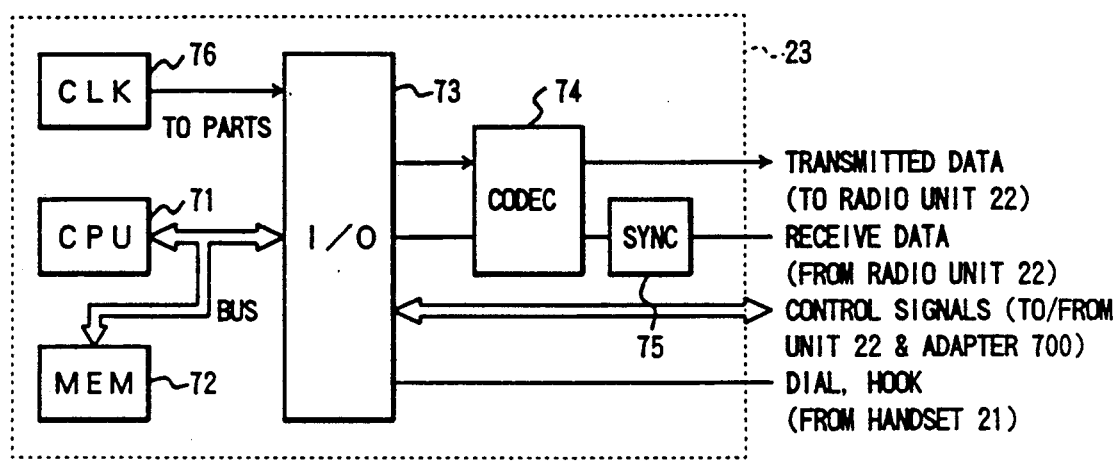
FIG. 5 is a block diagram of a controller of the automobile telephone shown in FIG. 3.

FIG. 5 is a block diagram of the controller 23 shown in FIG. 3. As shown in FIG. 5, the controller 23 comprises a CPU 71, a memory (MEM) 72, an input/output (I/O) interface 73, a coding and decoding circuit (CODEC) 74, a bit synchronization circuit (SYNC) 75, and a clock generator 76 (CLK). The CPU 71 executes the following control processes under the control of programs stored in the memory 72. More specifically, the CPU 71 controls a radio channel connection control regarding incoming and outgoing calls. For example, various control signals are sent to and received from, via the radio unit 22, the automobile telephone network 100 under the control of the CPU 71. Further, the CPU 71 controls the radio unit 22. For example, the CPU 71 controls the synthesizer 65 and the power amplifier 63 shown in FIG. 4. Furthermore, the CPU 71 controls an input/output process with respect to the handset 22.

The coding and decoding circuit 74 outputs encoded transmission data to the ratio unit 22. The bit synchronization circuit 75 subjects received data to a bit synchronization process. A bit-synchronized data from the circuit 75 is decoded. Various control signals are transferred among the controller 23, the radio unit 22 and the adapter 700. A dial signal and hook information are received from the handset 21. The I/O interface 73 establishes an interface with the CPU 71 and the memory 72. A clock signal generated by the clock generator 76 is output to the structural elements of the controller 23 and the handset 21.

Figure 6:
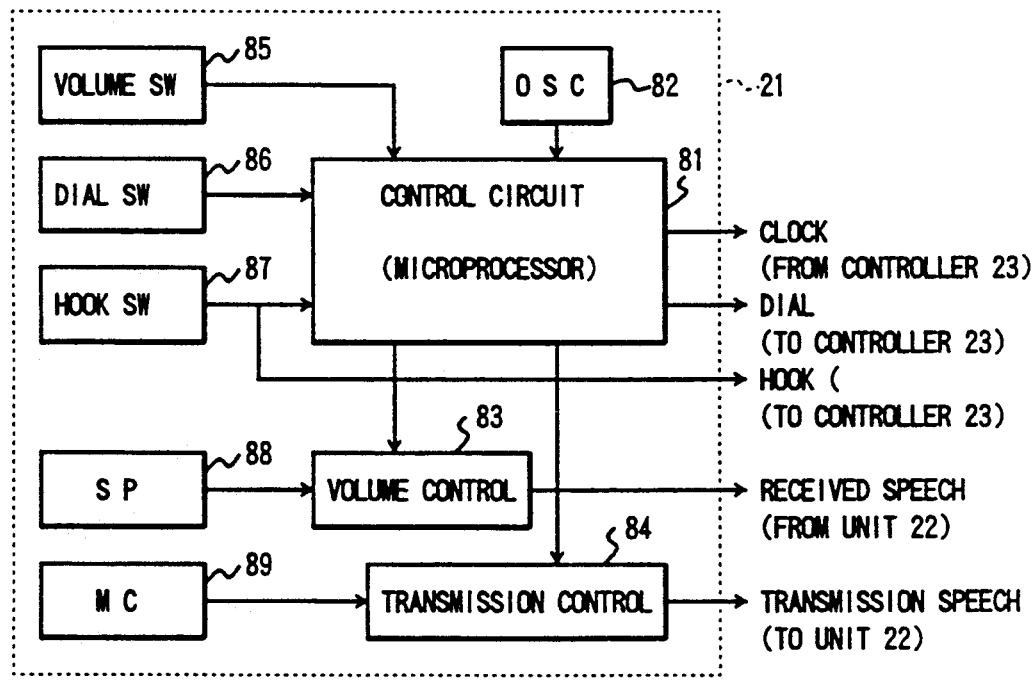
FIG. 6 is a block diagram of a handset of the automobile telephone shown in FIG. 3.

FIG. 6 is a block diagram of the handset 21 shown in FIG. 3. As shown in FIG. 6, the handset 21 comprises a control circuit (microprocessor) 81, an oscillator (OSC) 82, a volume controller 83, a microphone control 84, a volume control switch 85, a dial switch 86, a hook switch 87, a speaker 88 and a microphone 89. The microprocessor 81 controls the entire operation of the hand set 21. The clock signal from the controller 23 shown in FIG. 5 is applied to the microprocessor 81. Further, the microprocessor 81 receives a signal oscillated by the oscillator 82, a volume control signal from the volume control switch 85, the dial signal from the dial switch 86, and the hook information from the hook switch 87. The speech signal received from the radio unit 22 is applied to the volume controller 83, which is controlled by the microprocessor 81 in accordance with the setting of the volume control switch 85. A speech signal from the microphone 89 passes through the microphone controller 84, which outputs the transmission speech signal to the radio unit 22. The microphone controller 84 controls, for example, the level of the speech signal.

Figure 7:
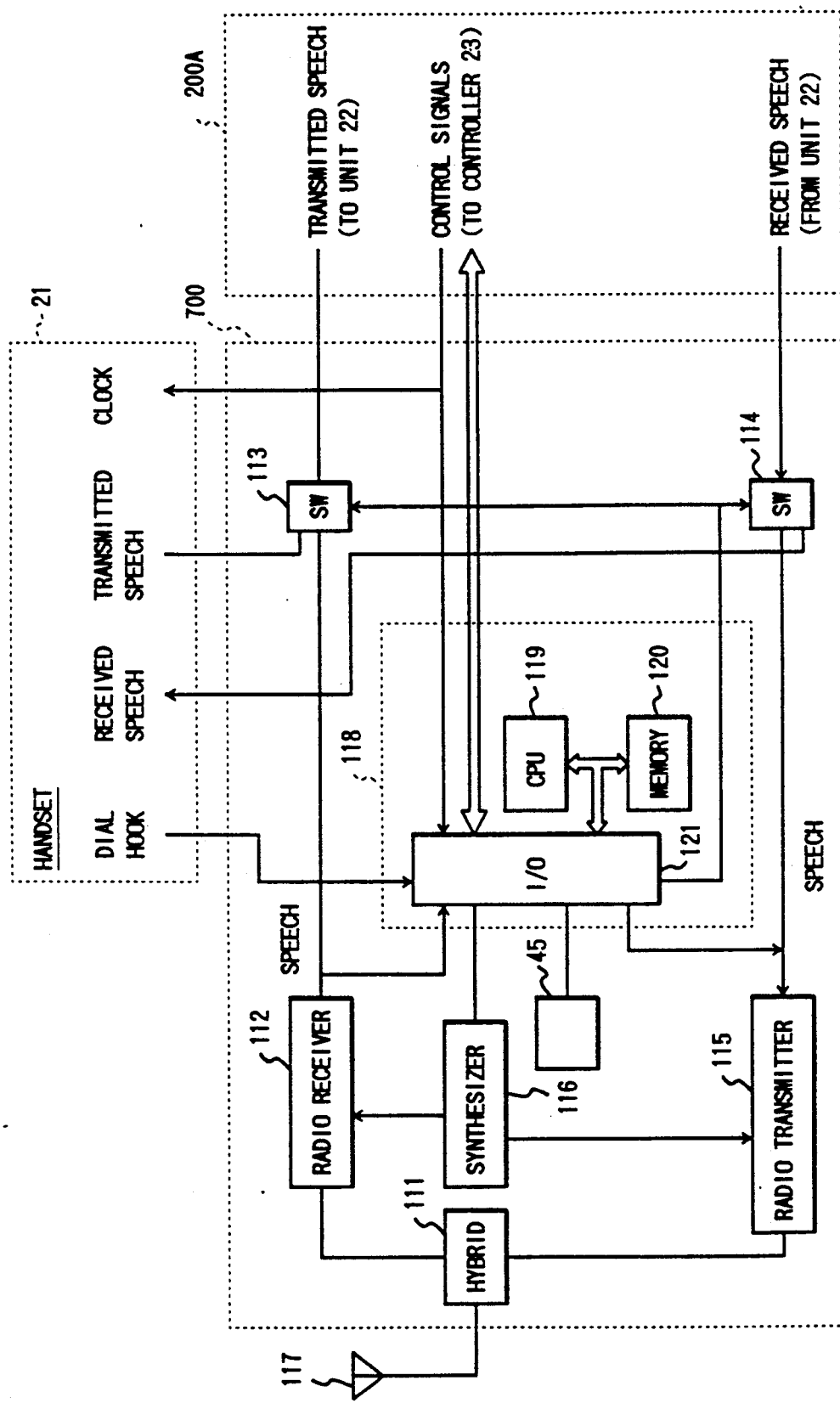
FIG. 7 is a block diagram of the adapter shown in FIG. 3.

FIG. 7 is a block diagram of the adapter 700. The adapter 700 comprises a reception system, a transmission system, a synthesizer 116, an antenna 117, and a control circuit 118. A hybrid circuit 111 connected to an antenna 117 is provided between the reception system and the transmission system. The reception system comprises a radio receiver 112 and a switch circuit 113. The transmission system comprises a switching circuit 114 and a radio transmitter 115. The control circuit 118 comprises a CPU 119, a memory 120 and an input/output (I/O) interface 121.

A radio signal, such as a speech signal, from a portable telephone PS located outside the service area of the portable telephone system 600 is received by the radio receiver 112 via the antenna 117 and the hybrid circuit 111. The radio receiver 112 uses a signal generated by the synthesizer 116 in order to, for example, mix the signal with the received speech signal. The switch 113 selects either the speech signal from the radio receiver 112 or a speech signal from the handset 21 in response to receipt of a select signal generated by the control circuit 118. The selected speech signal is sent to the modulator 61 of the radio unit 22 shown in FIG. 4. The switch 114 outputs a speech signal received from the radio unit 22 to either the handset 21 or the radio transmitter 115 in response to receipt of a select signal generated by the control circuit 118. The radio transmitter 115 transmits the speech signal via the hybrid circuit 111 and the antenna 117. The radio transmitter 115 uses the signal generated by the synthesizer 116 in order to, for example, mix the signal with the speech signal from the switching circuit 114.

The CPU 119 of the control circuit 118 controls the entire operation of the adapter 700 in accordance with programs stored in the memory 120, which comprises a RAM and a ROM. The I/O interface 121 receives the dial signal and the hook information from the handset 21 and data contained in the signal from the radio receiver 112, and outputs the signals to the CPU 119 or the memory 120 under the control of the CPU 119. Further, the I/O interface 121 outputs a control signal to the synthesizer 116 and the aforementioned select signals supplied to the switching circuits 113. The control signal applied to the synthesizer 116 is used to, for example, vary the oscillation frequency thereof in order to obtain different tuning frequencies of the radio receiver 112 and the radio transmitter 115. Furthermore, the I/O interface 121 outputs data to the input side of the radio transmitter 115. The control signal discriminator 33, the automatic dialing unit 34, the registers 35-37, 41 and 46, the selector 42, the coincidence detector 47, the unit 44 and the timer 51 shown in FIG. 2 are implemented by the control circuit 118 shown in FIG. 7. The radio receiver 31 and the radio transmitter 32 shown in FIG. 2 correspond to the radio receiver 112 and the radio transmitter 115 shown in FIG. 7, respectively. The switching circuit 43 shown in FIG. 2 comprises the switching circuits 113 and 114. The signal multiplexer 38 shown in FIG. 2 is provided on the input side of the radio transmitter 115, although not shown in FIG. 7 for the sake of simplicity.

Figure 8:
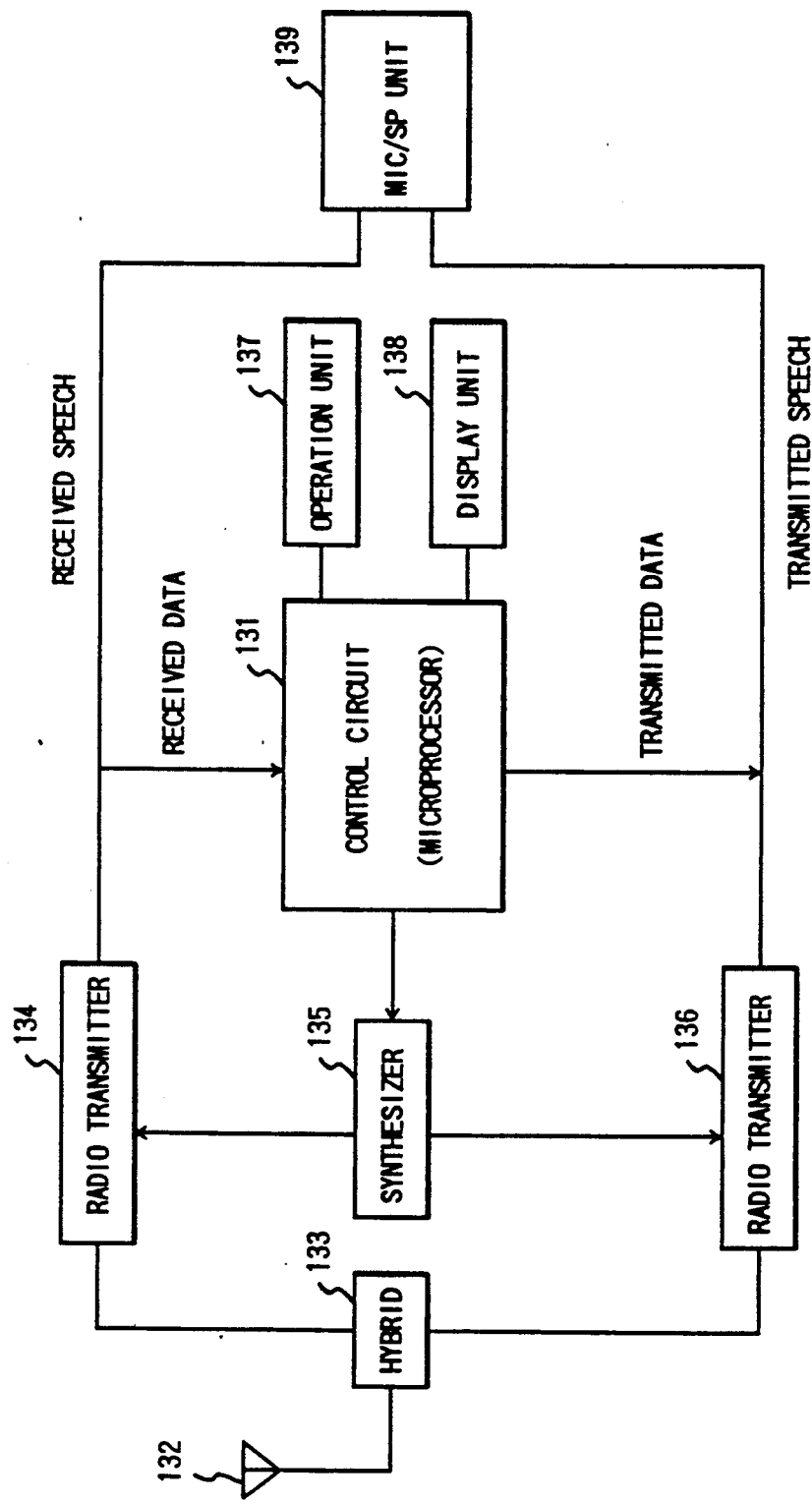
FIG. 8 is a block diagram of a portable telephone.

FIG. 8 is a block diagram of the portable telephone PS, which comprises a control circuit (microprocessor) 131, an antenna 132, a hybrid circuit 133, a radio receiver, a synthesizer 135, a radio transmitter, an operation unit 137, a display 138 having, for example, a liquid display, and a speaker/microphone unit 139. The radio receiver 134 receives a signal via the antenna 132 and the hybrid circuit 133. Data contained in a signal output by the radio receiver 134 is applied to the control circuit 131, and a speech signal contained therein is applied to the speaker/microphone unit 139. A speech signal to be transmitted is applied to the radio transmitter 136, which also receives data from the control circuit 131. The radio transmitter 136 generates a transmission signal, such as a modulated signal, via the hybrid circuit 133 and the antenna 132. The synthesizer generates a variable frequency signal used for selectively using radio channels. The display 138 displays information regarding power ON/OFF, an electric field strength, and a telephone (identification) number. The operation unit 137 includes a power switch, a ten key, an on-hook key, an off-hook key, a volume control key and so on.

Figure 9:
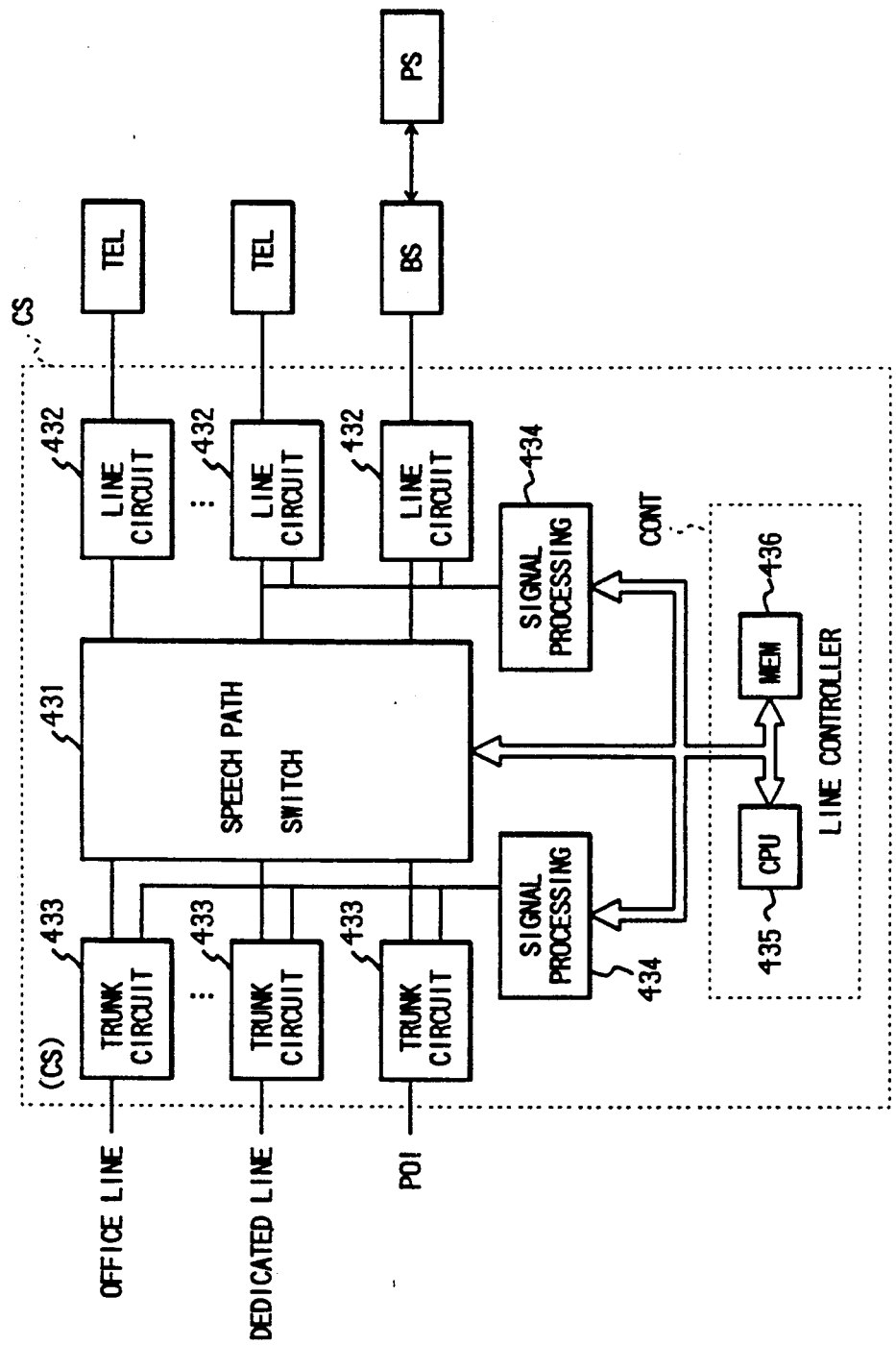
FIG. 9 is a block diagram of a center station in a portable telephone system.

FIG. 9 is a block diagram of a portable telephone exchange (center station: CS) of the portable telephone system 600. The center station CS comprises, in addition to the aforementioned exchange BX and the line controller CONT, a speech path switch 431, line circuits 432, trunk circuits 433, signal processing circuits 434, and the line controller CONT. Telephone sets TEL and radio base stations BS are coupled to the speech path switch 431 via the line circuits 432. The line circuits 432, which are interface circuits, pass speech information including speech signals, and control signals necessary for controlling communications, such as telephone numbers. The portable telephones PS are coupled to the speech path switch 431 via the radio base station BS and the line circuits 432. The speech path switch 431 is coupled to other networks via the trunk circuits 433, office lines, dedicated lines, and POI lines. Control information regarding, for example, telephone numbers, are transmitted via the signal processing circuit 434 and the line circuits 432, and received via the trunk circuits 433 and the signal processing unit 434. The control circuit CONT comprises a CPU 435 and a memory 436. The line controller CONT controls the entire operation of the center station CS and the radio base stations BS. The aforementioned PID of each portable telephone located outside the system 600 is registered in the memory 436.

A description will now be given of the operation of the embodiment of the invention. First of all, a procedure for the registration of the PID (position) of the portable telephone located outside the service area of the system 600 will be described with reference to FIGS. 10, 11A, 11B, 11C and 12.

Figure 10:
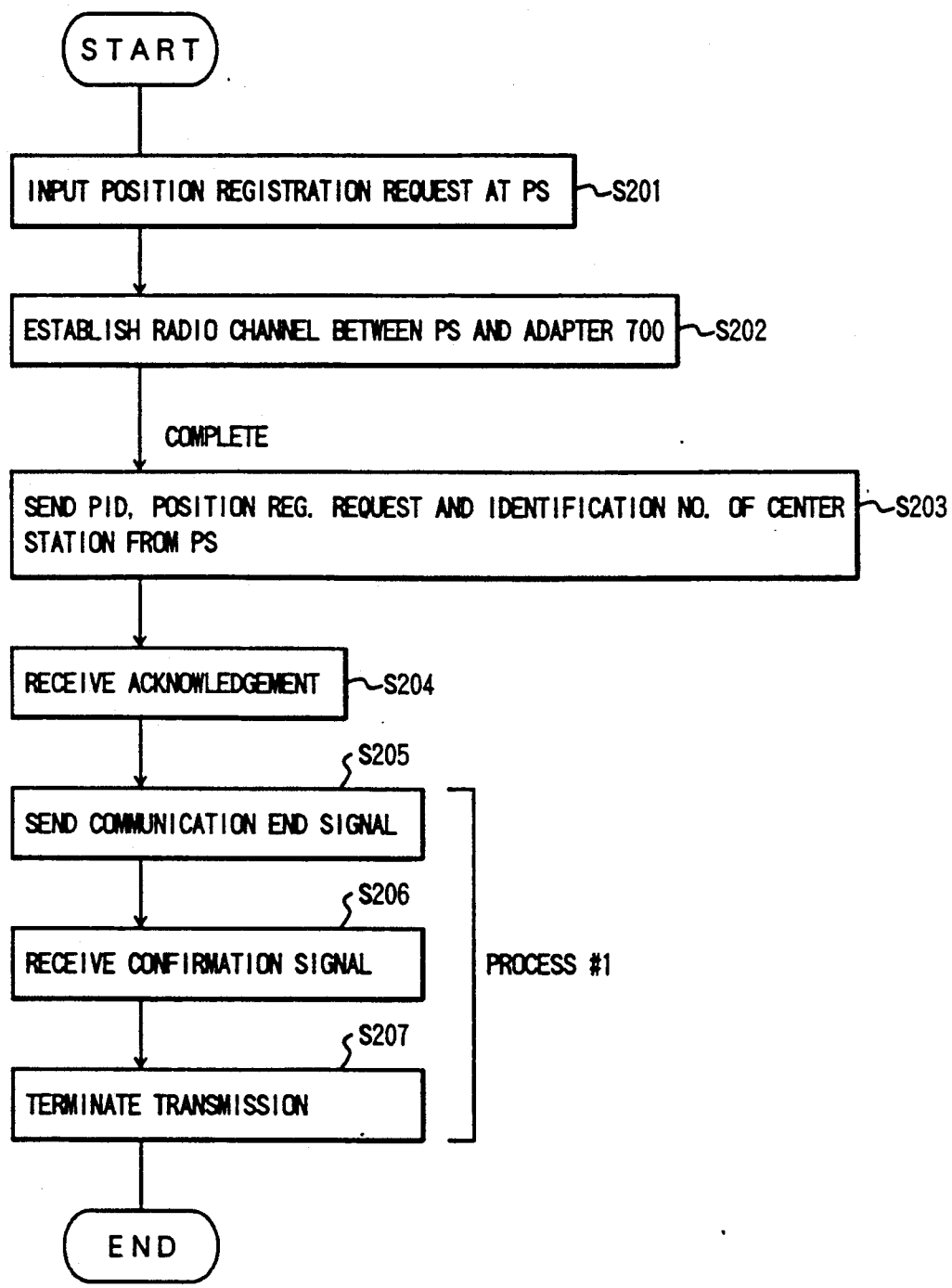
FIGS. 10, 11A, 11B, 11C, 12, 13 and 14 are flowcharts of a process for registering the position of a portable station located outside a service area of the portable telephone network.

FIG. 10 shows a part of the position registration process executed in the portable telephone PS located out of the service area of the system 600. In step S201, a position registration entry is made by, for example, pressing a position registration key on the operation unit 137 shown in FIG. 8. Transmission data corresponding to the above key entry is generated by the control circuit 131 (FIG. 8) and transmitted via the radio transmitter 136, the hybrid circuit 133 and the antenna 132. The transmission data is applied to the CPU 119 via the antenna 117 (FIG. 7), the radio receiver 112, and the I/O interface 121. Then, in step S202, control data are transferred between the control circuit 118 of the adapter 700 and the control circuit 131 of the portable telephone PS in order to establish a radio channel. After the radio communication has been established, in step S203 the portable telephone PS sends the adapter 700 its own PID, the position registration request signal, and the identification number of the center station CS of the system 600 shown in FIG. 9. These signals are registered in the control circuit (microprocessor) 131 beforehand. As will be been described in detail later, the adapter will reject the position registration request from a portable telephone having a PID which has been registered in the control circuit 118 thereof. In step S204, the adapter 700 sends back an acknowledgement signal to the portable telephone PS. The portable telephone PS sends a communication end signal in step S205, and receives a communication end confirmation signal from the adapter 700 in step S206. The portable telephone terminates the transmission process in step S207.

Figure 11A:
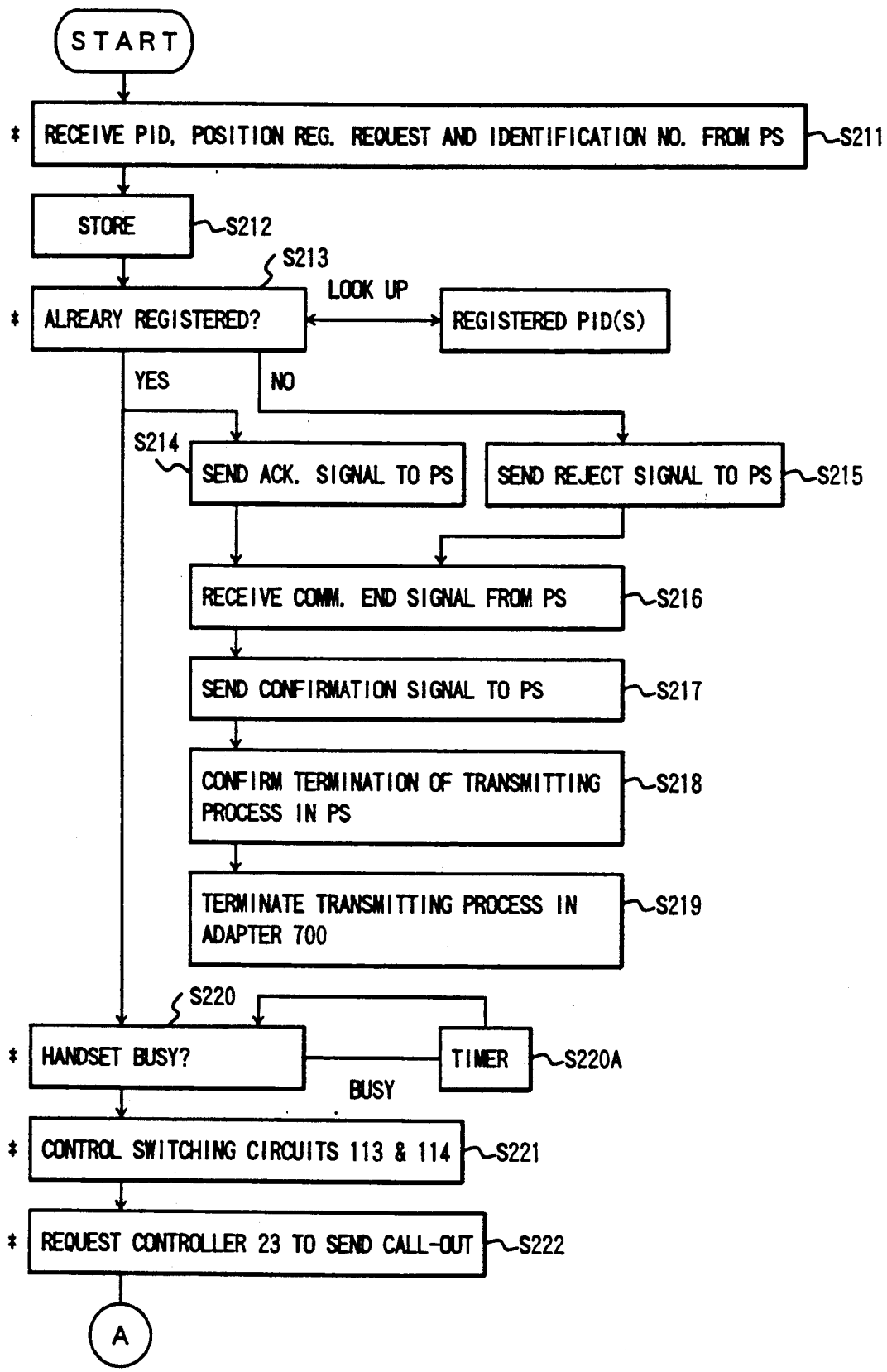
Figure 11B:
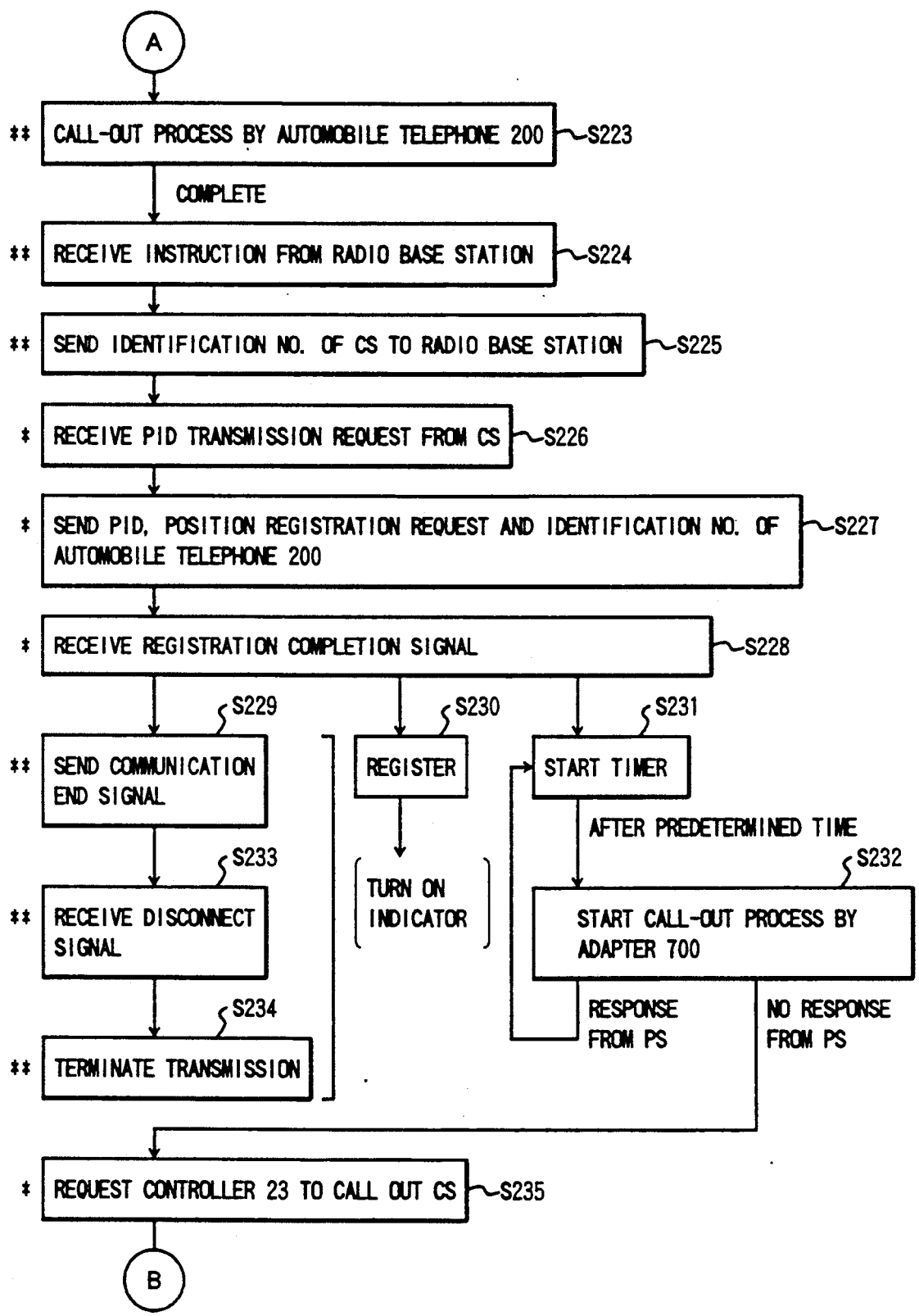
Figure 11C:
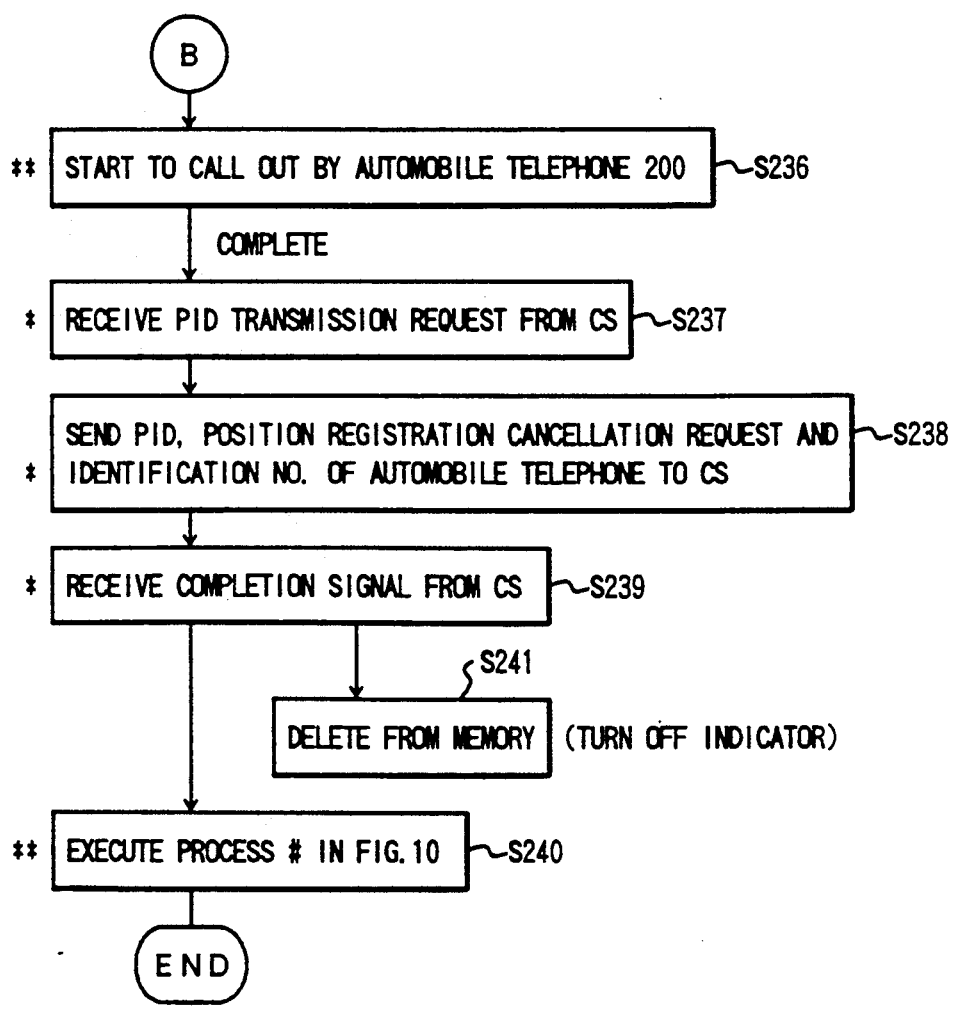

FIGS. 11A, 11B and 11C show a part of the position registration process executed by the automobile telephone 200 with the adapter 700 added thereto. In FIGS. 11A–11C, symbol "*" indicates a task executed by the control circuit 118 of the adapter 700, and symbol "**" indicates a task executed by the controller 23 shown in FIG. 5. In step S211, the controller 118 of the adapter 700 receives the PID, the position registration request signal and the identification number of the center station CS, which were output in step S203 shown in FIG. 10. In step S212, the received signals are stored in the memory 120. In step S213, the CPU 119 determines whether or not the received PID has been registered by comparing the received PID with a PID or PIDs registered in an internal register (corresponding to the register 37 shown in FIG. 2). When it is determined that the received PID has not been registered, the control circuit 118 outputs a reject signal to the portable telephone PS in step S215. When it is determined that the received PID has been registered, the control circuit 118 outputs the aforementioned acknowledgement signal to the portable telephone PS in step S214. In step S216, the control circuit 118 receives the communication end signal sent in step S205 shown in FIG. 10, and sends the communication end confirmation signal to the portable telephone PS in step S217. In step S218, the control circuit 118 confirms that the transmission of the portable telephone PS has been terminated. In step S219, the controller 118 terminates the transmission procedure.

In step S220, the control circuit 118 determines whether or not the handset 21 is busy. When the result of this determination is affirmative, the control circuit 118 measures a predetermined time by means of an internal timer (step S220A), and executes step S220 again. The steps S220 and S220A are repeatedly carried out until it is determined that the handset 21 is idle. In step S221, the control circuit 118 controls the switching circuits 113 and 114 so that they connect the radio receiver 112 and the radio transmitter 115 to the radio unit 22. In step S222, the control circuit 118 requests the controller 23 to start a call-out process by transferring the identification number of the center station CS.

In step S223, the controller 23 executes the call-out process in accordance with a program stored in the memory 72 shown in FIG. 5. Thereby, a radio channel is established between the automobile telephone 200 and the automobile telephone network 100. In step S224, the controller 23 receives a dial signal output instruction signal from the automobile telephone network 100. In step S225, the controller 23 sends the identification number of the center station CS to the automobile telephone network 100. Then, the network 100 calls out the center station CS via, for example, the dedicated line connected to one of the trunk circuits 433 shown in FIG. 9. In response to receipt of the call, the line controller CONT of the center station CS sends back a PID transmission request to the adapter 700 via the automobile telephone network 100 and the automobile telephone 200.

The control circuit 118 of the adapter 700 shown in FIG. 7 receives the PID transmission request signal in step S226. In step S227, the control circuit 118 sends the PID, the position registration request signal and the identification number of the automobile telephone 200 to the center station CS. Then, the center station CS sends back the registration completion signal to the control circuit 118. In step S228, the control circuit 118 receives the registration completion signal from the center station CS. In response to receipt of this signal, in step S230 the PID is registered in the register 37 (FIG. 2) formed in the memory 120 of the control circuit 118. In step S231, the indicator 45 is turned ON.

In step S229, the controller 23 sends a communication end signal to the automobile telephone network 100, and receives a communication end confirmation (disconnect) signal therefrom in step S233. In step S234, the transmission procedure is terminated.

In step S231, the timer 51 built in the control circuit 118 starts to operate in response to receipt of the registration completion signal. After a predetermined time, the controller 118 starts a call-out process of calling the portable telephone PS. If a response is received from the portable telephone PS, the timer is reset. If the control circuit S118 receives no response, steps S235–S237 are executed in the same manner as the steps S222–S226. In step S238, the control circuit 118 of the adapter 700 sends the PID, the position registration canceling request signal, and the identification number of the automobile telephone 200 to the center station CS. In step S239, the control circuit 118 receives the registration canceling confirmation signal from the center station CS. In response to receipt of the registration canceling confirmation signal, the control circuit 118 turns OFF the indicator 45. In step S240, the process of terminating the transmission between the mobile device block 200A and the mobile telephone network 100 is carried out in step S240.

Figures 12, 13:
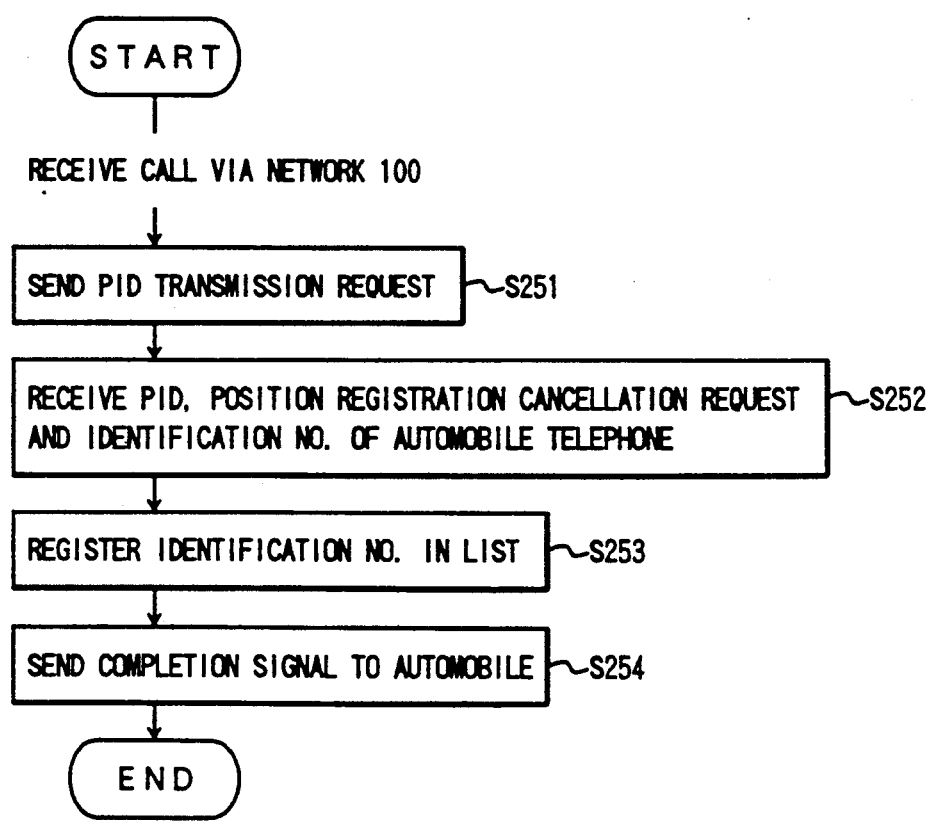

FIG. 12 shows a part of the position registration process executed by the center station CS shown in FIG. 9. The center station CS is called out in step S225 shown in FIG. 11B. In step S251, the line controller CONT of the center station outputs the PID transmission request to the adapter 700. The PID transmission request is received in step S226 shown in FIG. 11B. In step S252, the line controller CONT of the center station CS receives the PID, the position registration request signal and the identification number of the automobile mobile telephone 200. The identification number of the automobile telephone 200 is registered in a position registration list relating to the received PID of the portable telephone PS.

FIG. 13 shows an example of the position registration list formed in the memory 436 of the line controller CONT shown in FIG. 9. The list shown in FIG. 13 shows that the portable station having PID "123333" is in a service area covered by a radio base station BS in the portable telephone system 600, the above radio base station having identification number "0033". The list shown in FIG. 12 further shows that the portable station having PID "12344" is located in connection with the automobile telephone having identification number "030-32-XXXXX". In step S254, the line controller CONT sends the registration completion signal to the adapter 700.

Figure 14:
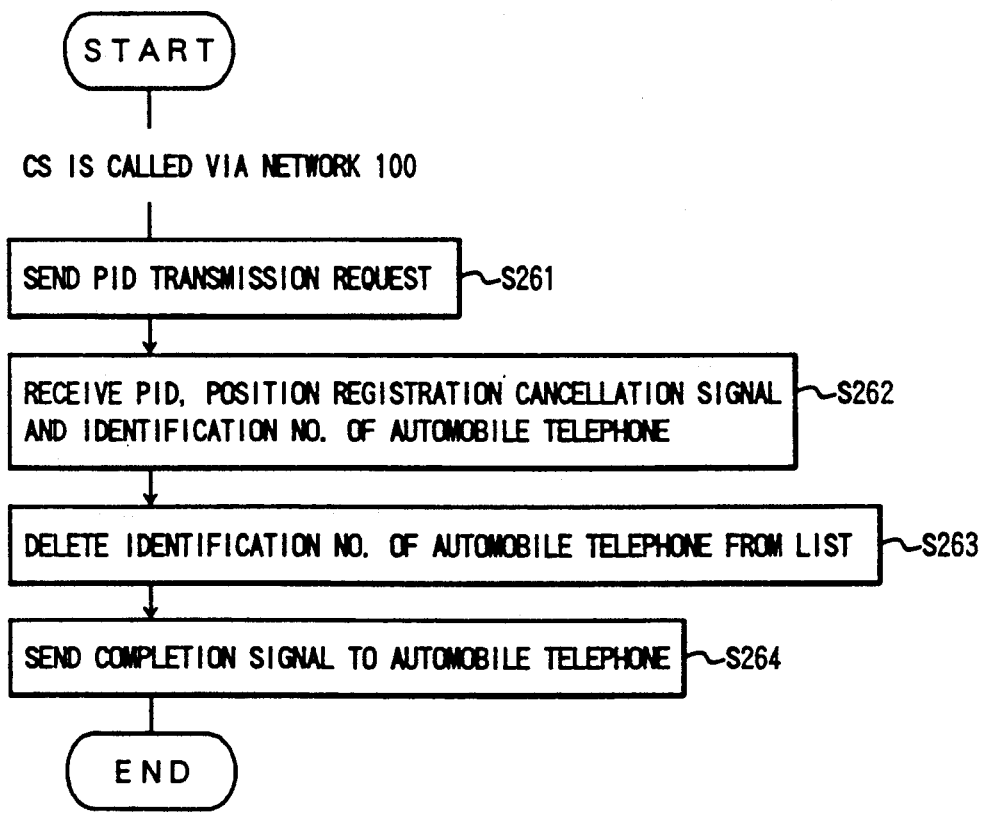

FIG. 14 shows a process which is executed by the center station CS when the position registration canceling request signal is output via the automobile telephone 200. In response to receipt of a call via the automobile telephone network 100, the line controller CONT sends the PID transmission request to the adapter 700 in step S261. In step S262, the line controller CONT receives the PID, the position registration canceling signal, and the identification number of the automobile telephone 200, which were sent in step S238 shown in FIG. 11C. In step S263, the CPU 435 shown in FIG. 9 deletes the identification number of the automobile telephone 200 from the position registration list shown in FIG. 13. In step S264, the line controller CONT sends the position registration canceling completion signal to the automobile telephone 200 via the automobile telephone network 100.

Figure 15:
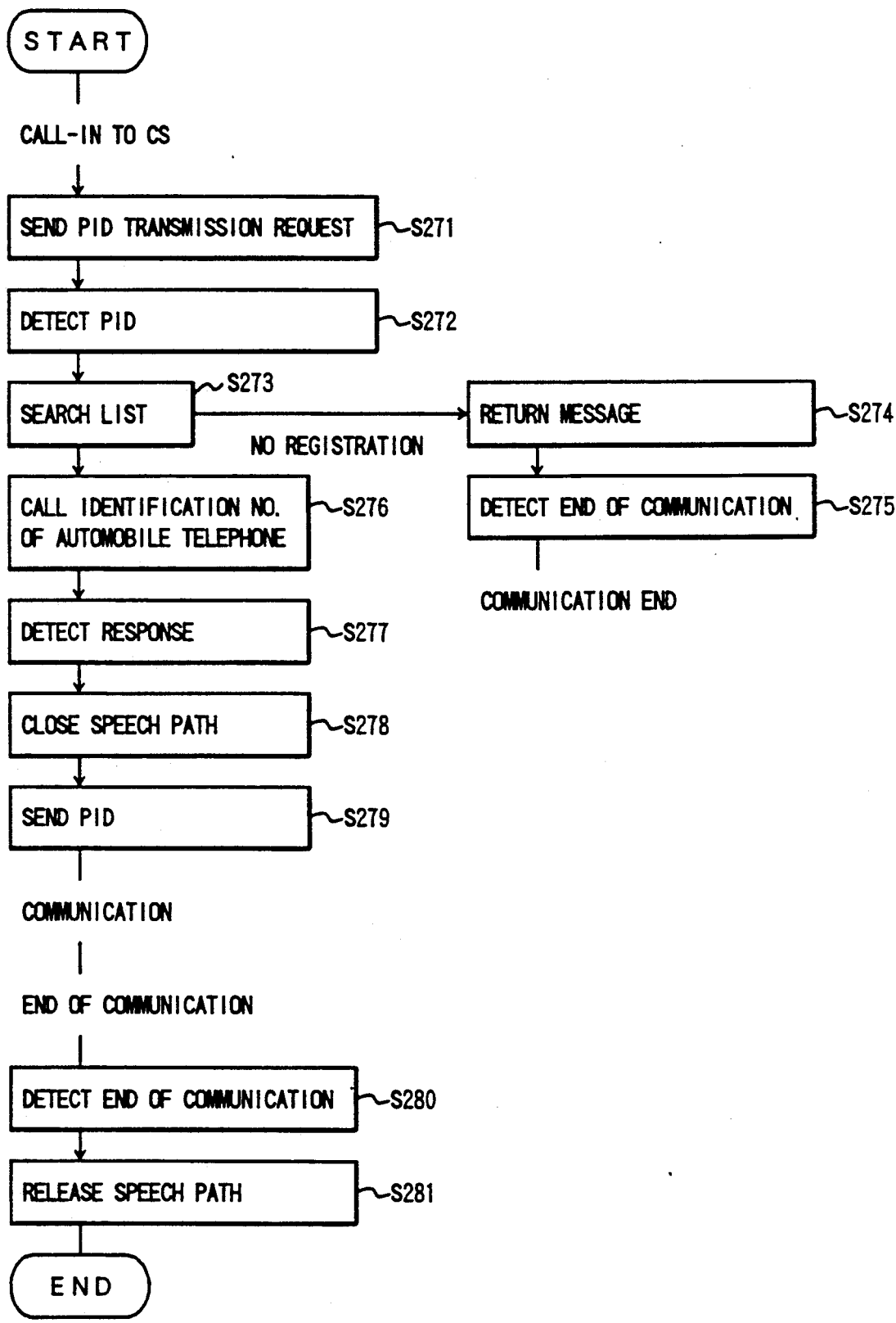
FIGS. 15, 16A and 16B are flowcharts of a process for processing a call-in addressed to a portable telephone registered in an automobile telephone.

FIG. 15 shows a part of a process for handling a call addressed to a portable telephone having the PID which has been registered in the center station CS, the above part being executed by the center station CS shown in FIG. 9. In response to receipt of a call received by the center station CS, the line controller CONT requests a station which generates the above call to send the PID of a called portable telephone in step S271. In step S273, the CPU 435 searches the position registration list shown in FIG. 13. When the CPU 435 determines that the received PID has been registered in the position registration list shown in FIG. 13, the line controller CONT requests the automobile telephone network 100 to call out the addressed portable telephone PS in step S276. In step S277, the line controller CONT receives an acknowledgement signal from the automobile telephone network 100. In step S278, a speech path between the automobile telephone network 100 and the automobile telephone 200 is closed. In step S279, the line controller CONT sends the PID to the adapter 700 via the automobile telephone network 100 and the automobile telephone 200. After the speech communication ends, the line controller CONT detects the end of the speech communication in step S280 and releases the captured speech path from the in-use state. When it is determined that the received PID has been registered in the position registration list, in step S274 the line controller CONT sends back a message showing the called portable telephone is not located in any service areas to the calling station. In step S275, the line controller CONT detects the end of the call.

Figure 16A:
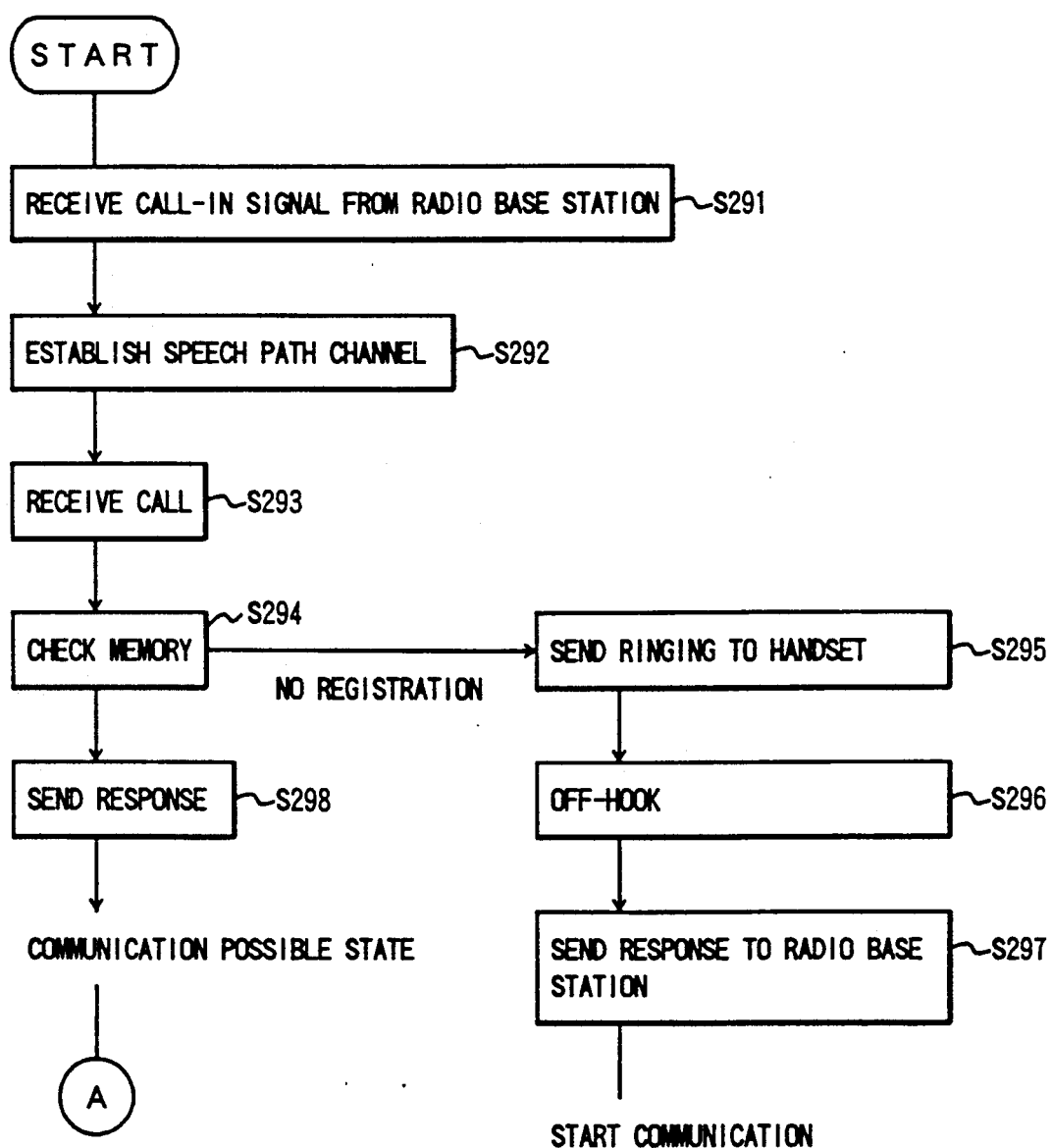
Figure 16B:
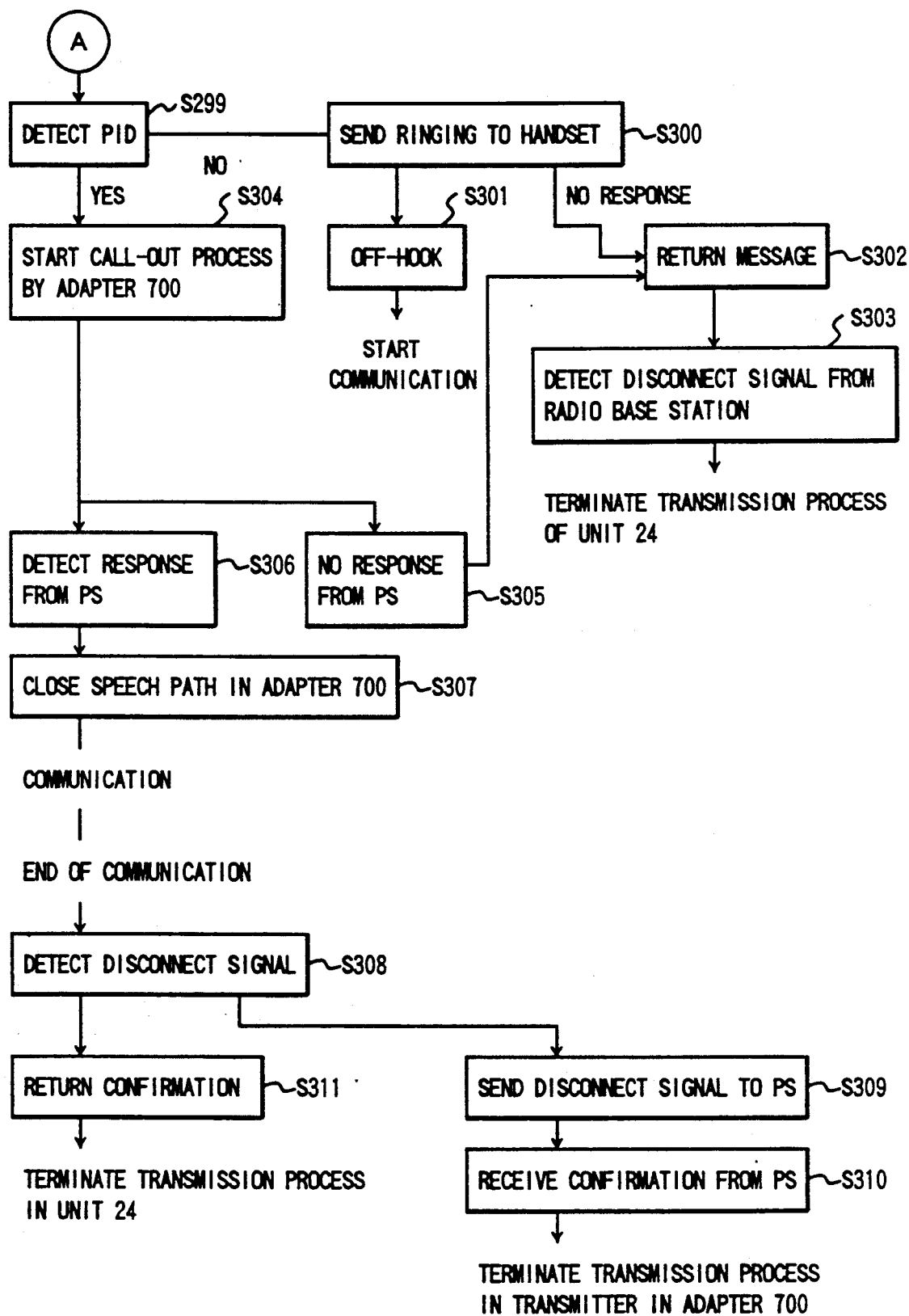

FIGS. 16A and 16B show a part of the process of handling a call addressed to a portable telephone having the PID which has been registered in the center station CS, the above part being executed by the automobile telephone 200 with the adapter 700 added thereto. In step S291, the controller 23 shown in FIG. 5 receives a call from the automobile telephone network 100 via the radio unit 22 shown in FIG. 4. In step S292, the controller 23 establishes a radio channel between the automobile telephone 200 and the automobile telephone network 100. In step S293, the controller 23 receives a ringing signal output instruction from the automobile telephone network 100. In step S294, the control circuit 118 shown in FIG. 7 controller 23 refers to the register used in step S230 in response to receipt of a control signal from the controller 23 shown in FIG. 5. If it is determined that there is no registration of the PIDs, in step S295 the controller 23 sends the ringing signal to the handset 21 shown in FIG. 21. In step S296, the controller 23 receives a response signal by off-hooking, and sends a response signal to the automobile telephone network 100 in step S297. Then, speech communication can take place.

When it is determined, in step S294, that there is at least one registered portable telephone, the controller 23 sends back a related response signal to the mobile telephone network 100, so that speech communication becomes possible. In step S299, the control circuit 118 of the adapter 700 shown in FIG. 7 determines whether or not the received PID has been registered in the register 37 formed in the memory 120 shown in FIG. 7. When it is determined that the received PID has not been registered in the register 37, the ringing signal is set to the handset 21 in step S300. After the response signal is sent back by off-hooking in step S301, speech communication becomes possible. When it is determined, in step S300, that the response signal is not sent back, a message indicating no response is sent back to the center station CS via the automobile telephone 200 and the automobile telephone network 100. In step S303, the controller 23 detects a disconnect signal from the automobile telephone network 100.

When it is determined, in step S299, that the received PID has been registered in the register 37, the adapter 700 starts a procedure for calling the addressed portable telephone PS. In step S304, a radio channel is established between the adapter 700 and the portable station PS under the control of the control circuit 118 shown in FIG. 7. When it is determined that no response from the portable telephone PS has been received, step S302 is executed. When a response signal due to off-hooking of the portable telephone PS is received in step S306, step S307 is executed, in which step a speech path in the adapter 700 is established by connecting the radio receiver 112 and the radio transmitter 115 shown in FIG. 7 to the mobile device block 200A having the radio unit 22 and the controller 23. Then, speech communication starts and then ends. In step S308, the controller 23 detects the disconnect signal from the automobile telephone network 100. In step S311, the controller 23 returns a disconnect confirmation signal to the automobile telephone network 100. Thereby, the transmission procedure of the mobile device block 200A is terminated. In step S309, the control circuit 118 of the adapter 700 sends a disconnect signal to the portable station PS. In step S310, the control circuit 118 receives a disconnect confirmation signal from the portable station PS. Thereby, the transmission procedure of the adapter 700 is terminated.

Figure 17:
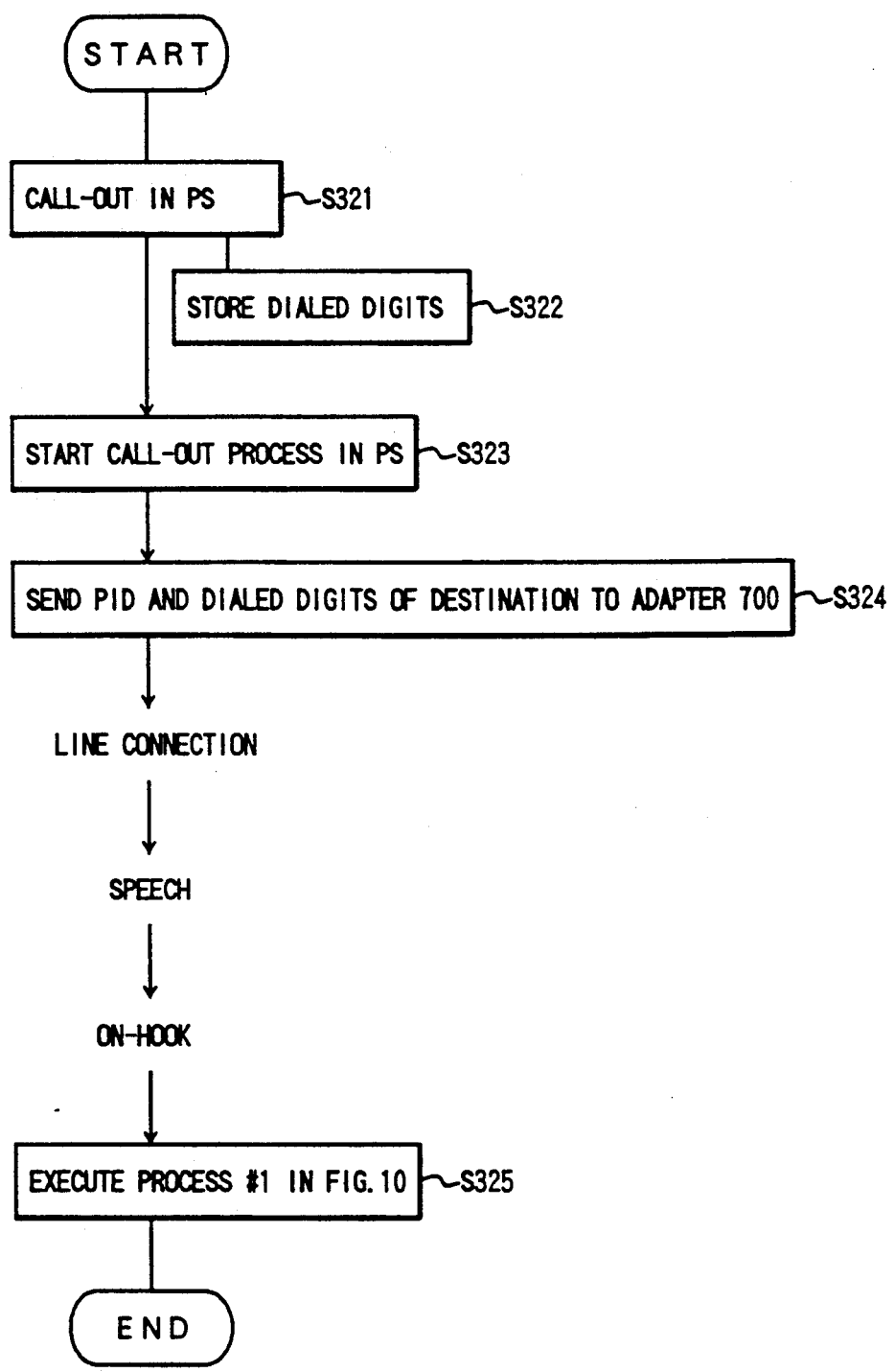
FIGS. 17 and 18 are flowcharts of a process for processing a call generated by a portable telephone and addressed to a normal telephone set.

FIG. 17 shows a part of a process executed when the portable station PS generates a call addressed to a normal telephone set, the above part being executed by the portable station PS. In step S321, a call-out process is carried out in the portable telephone PS by off-hooking the handset 139 (FIG. 8) and dialing the telephone (identification) number of a called station. In step S322, the dialed telephone number is stored in a register built in the control circuit (microprocessor) 131. In step S323, a call-out connection process is started in order to establish a radio channel between the portable station PS and the adapter 700 attached to the automobile telephone 200. As will be described later, a call from the portable telephone PS having the PID which has not been registered in the adapter 700 will be rejected. In step S324, the PID and the dialed number are sent to the adapter 700 via the established communication channel. Then, a line connection is made, and speech communication becomes possible. Thereafter, the on-hook operation is carried out, and the steps S205-S207 shown in FIG. 10 are performed.

Figure 18:
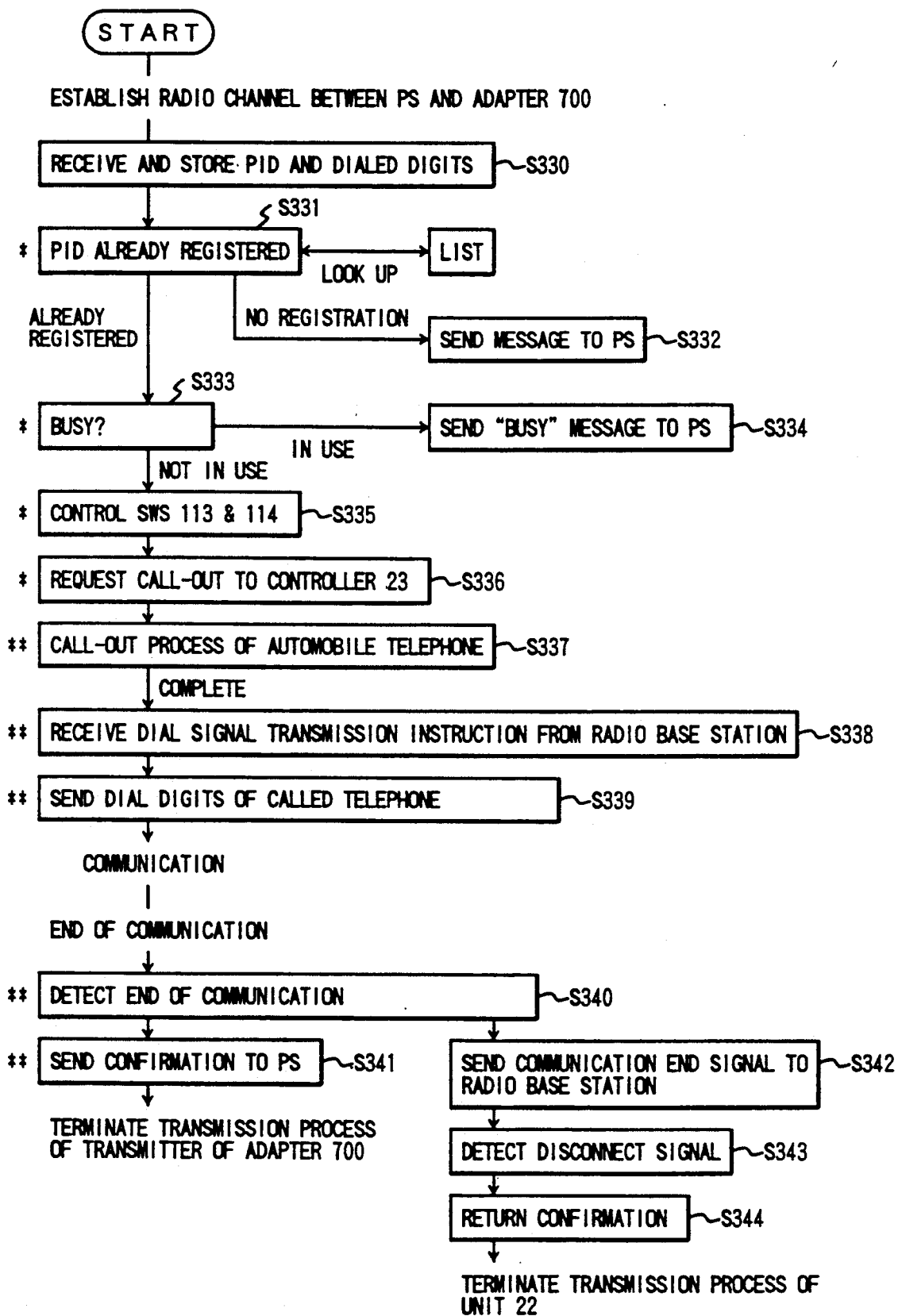

FIG. 18 shows a part of the process for processing a call from the portable telephone PS addressed to a normal telephone set, the above part being executed by the adapter 700 and the mobile device block 200A. The symbols "*" and "**" are used in the same manner as those used in FIGS. 11A, 11B and 11C. In step S330, the PID and the dialed digits sent in step S324 are stored in the memory 120 shown in FIG. 7. In step S331, the control circuit 118 of the adapter 700 determines whether or not the PID of the calling portable telephone PS has been registered by referring to the register 37. When it is determined that the PID of the calling portable telephone PS has been registered, a message showing a call-out service is not available is sent back to the portable telephone PS. When it is determined, in step S331, that the PID of the calling portable telephone has been registered, in step S333 the controller determines whether or not the handset 21 is in use. When the handset 21 is in use, in step S334 a message showing "busy" is sent back to the calling portable telephone PS. When the handset 21 is idle, in step S335 the radio receiver 112 and the radio transmitter 115 are connected to the radio unit 22 via the switches 113 and 1!4 under the control of the control circuit 118. It will be noted that the switching circuits 113 and 114 have the function of switching the speech signals. The flow of various control signals (control data) is switched by means of software. This holds true for step S221 shown in FIG. 11B. In step S336, the control circuit 118 requests the controller 23 to start a call-out process by transferring the dialed digits of the called telephone to the controller 23. In step S337, the controller 23 executes the call-out process and establishes a radio channel between the automobile telephone 200 and the automobile telephone network 100. In step S338, the controller 23 receives the dial signal output instruction signal from the automobile telephone network 100. In step S339, the controller 23 sends the dialed digits of the called telephone. Then, a communication channel is established between the automobile telephone network 100 and the center station CS. Thereafter, speech communication becomes possible. After the speech communication is terminated, the controller 23 detects a speech end signal from the portable telephone PS in step S340. In step S341, the control circuit 118 outputs a confirmation signal to the portable telephone PS. Then the transmission process of the adapter 700 is terminated. In step S342, the controller 23 outputs the speech end signal to the, automobile telephone network 100. In step S343, the controller 23 detects the disconnect signal from the automobile telephone network 100. In step S344, the controller 23 sends back the disconnect confirmation signal to the automobile telephone network 100. Then the transmission procedure of the automobile telephone 200 is terminated.

A description will now be given of a process executed when the portable telephone PS generates a call addressed to another portable telephone.

Figure 19:
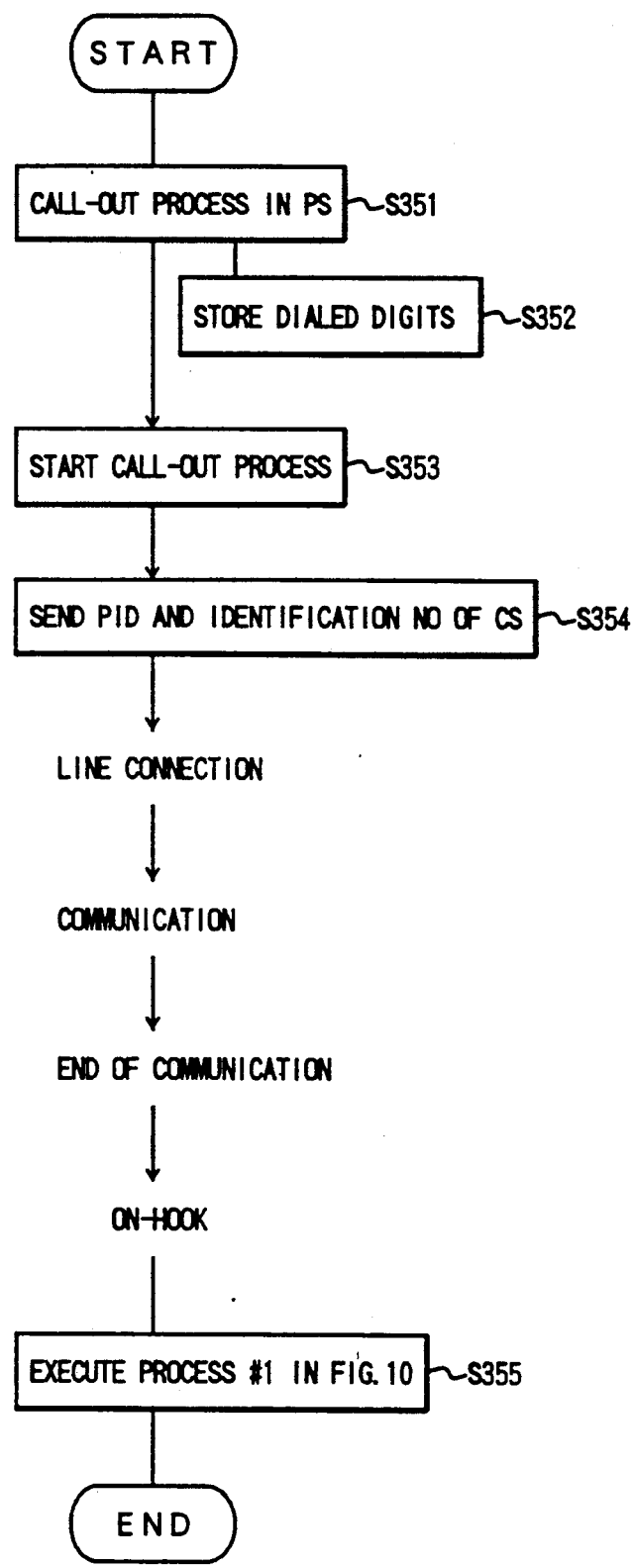

FIG. 19 shows a part of the process executed by the calling portable telephone PS. In step S351, the control circuit 131 of the portable telephone shown in FIG. 8 carries out the call-out process by entry of the identification number of the center station CS and the PID of the called portable telephone after off-hook. In step S352, the dialed digits are temporarily stored in the built-in memory of the control circuit 131. In step S353, the control circuit 131 starts the call-out process to establish a radio channel between the portable telephone PS and the adapter 700. If it is determined, during this step, that the PID of the calling portable telephone has been not registered in the adapter 700, the calling portable telephone PS will be rejected. In step S354, the control circuit 131 sends the PID of the called portable telephone and the identification number of the center station CS to the adapter 700. Then, a connection between the automobile telephone 200 and the called portable telephone is made via the automobile telephone network 100, the related center station CS and the related radio base station BS. After speech communication is terminated and the portable telephone switches to the on-hook state, in step S355 the speed end process for terminating the speech communication between the portable telephone PS and the adapter 700 is carried out in the same way as that of the steps S205-S207.

Figure 20A:
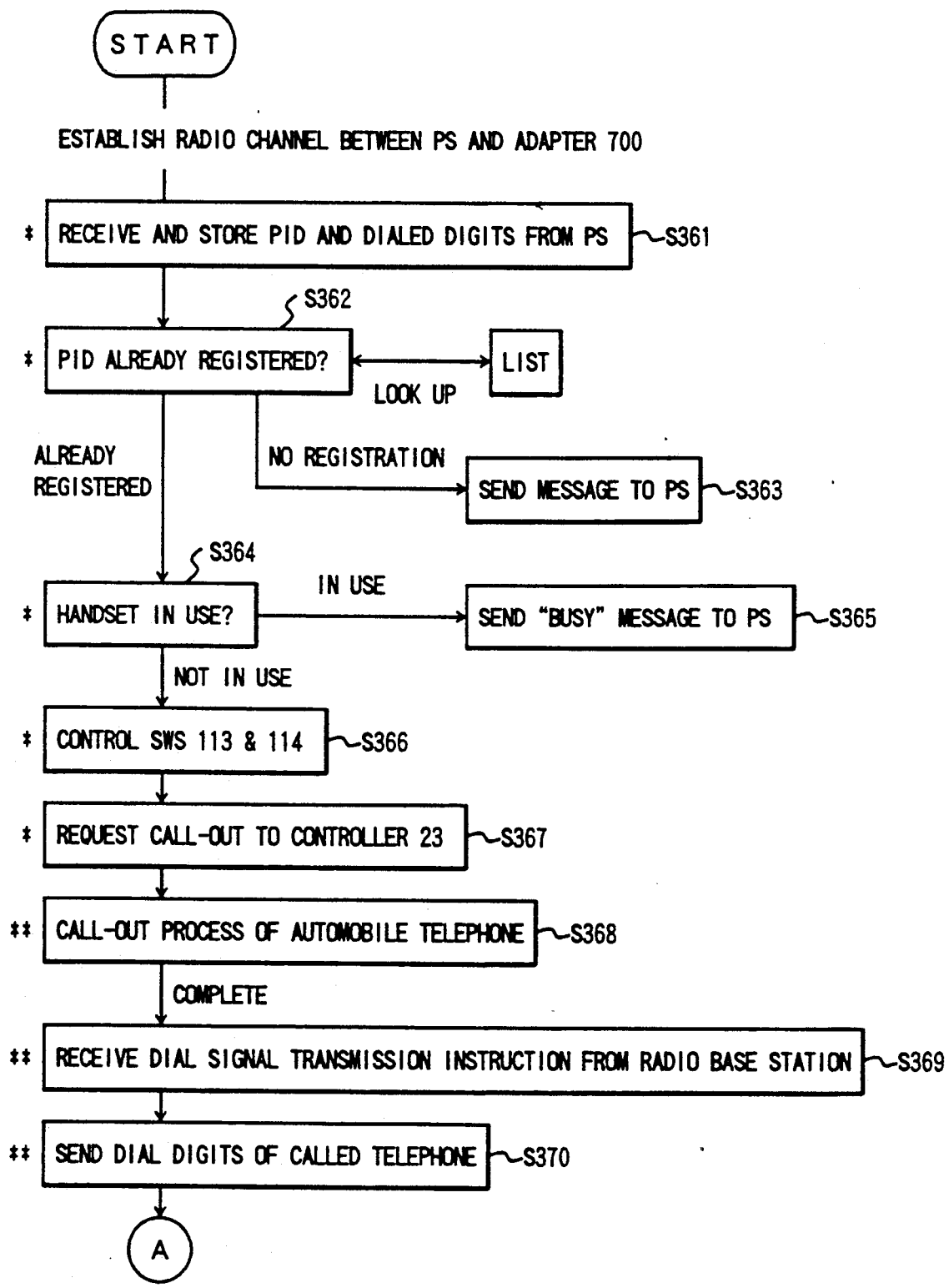

FIG. 20 shows a part of the process for calling out a portable telephone from a portable telephone located outside the service area of the system 600, the above part being executed by the automobile telephone 200 with the adapter 700 added thereto. After a radio channel between the calling portable telephone PS and the adapter 700 is established, in step S361 the control circuit 118 of the adapter 700 receives the PID of the calling portable telephone PS and the identification of the center station CS in which the calling portable telephone PS is originally registered. Then the received signals are registered in the memory 120 of the control circuit 118. Thereafter, steps S362-S369 are executed as in the case of the steps S331-S338 shown in FIG. 18. In step 370, the identification number of the center station CS is sent out to the center station via the automobile telephone network 100 by the controller 23. The control circuit 118 of the adapter 700 detects the PID transmission request signal from the center station CS. The control circuit 118 sends the PID of the called portable station to the center station in step S372. Then speech communication becomes possible. After the speech communication is terminated, in step S373 the control circuit 118 detects the speech end signal from the portable station PS. Thereafter, steps S374-S377 are carried out in the same way as the steps S341-S344 shown in FIG. 18.

Figure 21:
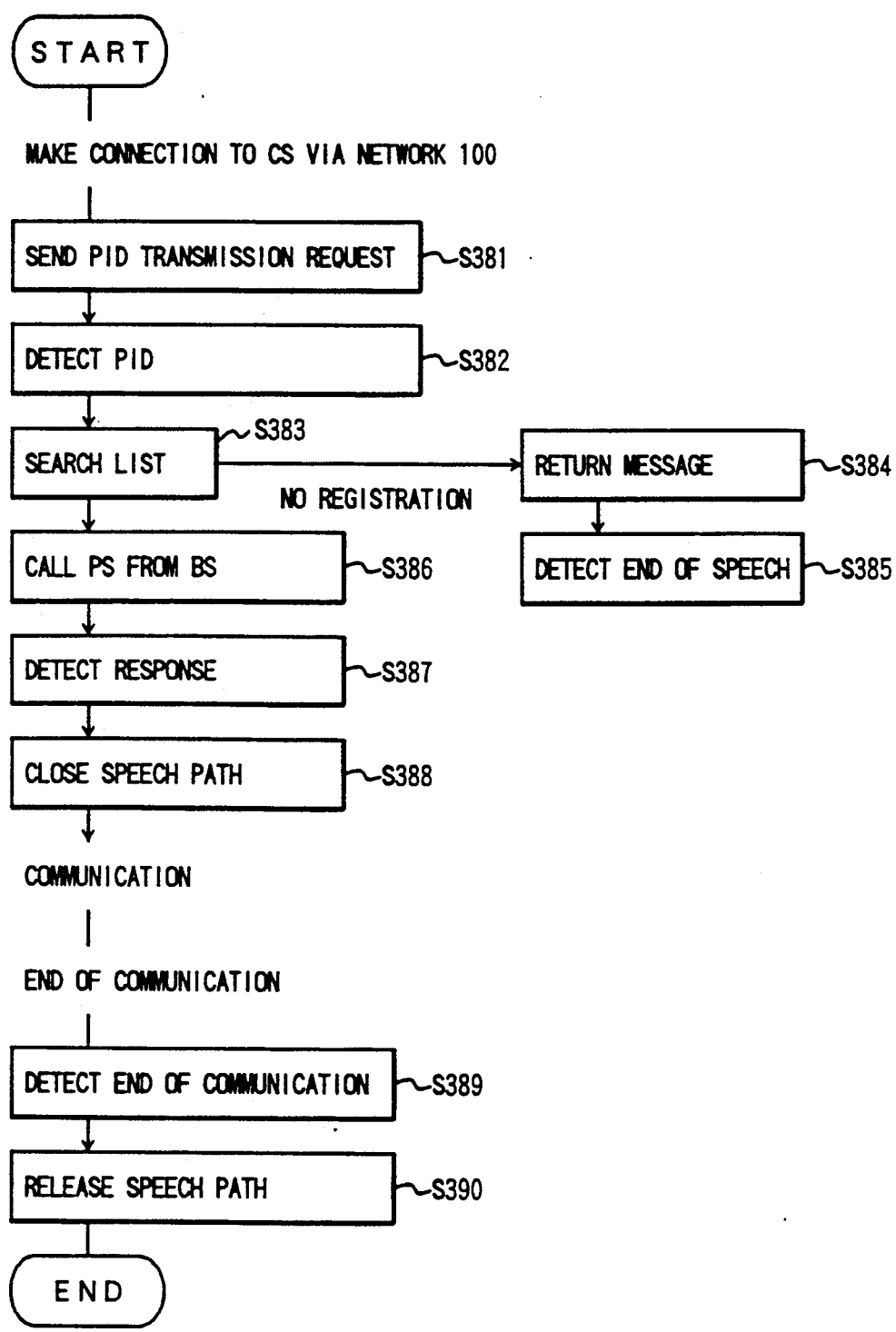

FIG. 21 shows a part of the process for calling a portable telephone from a portable telephone located outside the service area of the system 600, the above part being executed by the center station CS. In response to receipt of the identification number of the center station sent in step S370 shown in FIG. 20, the line controller CONT of the center station CS sends the PID transmission request signal to the adapter 700 in step S381. In step S382, the line controller CONT of the center station CS detects the PID of the called portable telephone PS sent in step S372 shown in FIG. 20. In step S383, the CPU 435 of the line controller CONT searches the position registration list shown in FIG. 13. When it is determined, in step S383, that the received PID has not been registered, a message, showing the called portable station is not in any service areas, is sent back to the adapter 700. In step S385, the line controller CONT detects the end of the speech communication. When it is determined, in step S383, that the received PID has been registered, in step S386 the portable telephone PS having the received PID is called out via the associated radio base station BS. In step 387, the line controller CONT detects a response from the called portable telephone PS. In step S388, a speech path connecting the calling and called portable telephones is established. Thereby, speech communication becomes possible. In step S389 the line controller CONT detects the end of the speech communication. In step S390, the speech path is released from the in-use state.

The automobile telephone network 100 used in the aforementioned embodiments of the present invention is a conventional automobile telephone network, which includes at least a center station including a speech path switch and a controller, and one or a plurality of radio base stations. The controller of the automobile telephone network 100 manages relation between the radio base stations thereof and the positions of the automobile telephones.

The present invention is not limited to the specifically disclosed embodiments. For example, the mobile station to which the adapter 700 is to be connected is not limited to automobile telephones.

What is claimed is:

1. A mobile communication system comprising:
    a first mobile communication network having a first service area and a controller;
    first mobile stations having first identification data registered in said first mobile communication network in order to identify positions of the first mobile stations and receive a communication service provided by said first mobile communication network;
    a second mobile communication network communication with said first mobile communication network and having a second service area;
    second mobile stations having second identification data registered in said second mobile communication network in order to receive a communication service provided by said second mobile communication network; and
    radio communication adapter means, connected to said second mobile stations, for coupling, via a radio channel, the first mobile stations located outside the first service area with said second mobile stations,
    wherein the first identification data of the first mobile stations located outside the first service area are respectively transferred to said radio communication adapter means, said second mobile stations and said second mobile communication network, and registered, in connection with the second mobile stations by said controller, in said first communication network.

2. A mobile communication system as claimed in claim 1, wherein a first radio communication interface between said first mobile communication network and said first mobile stations is the same as a second radio communication interface between said radio communication adapter means and said second mobile stations.

3. A mobile communication system as claimed in claim 1, wherein:
said radio communication adapter means comprises adapters respectively attached to the second mobile stations, and
wherein each of said adapters comprises
requesting means for requesting that the first identification data o the first mobile stations located outside the first service area is registered in said first mobile communication network via one of the second mobile stations and said second mobile communication network.

4. A mobile communication system as claimed in claim 3, wherein each of said adapters comprises means for sending the second identification data of said one of the second mobile stations to said first mobile communication network via said one of the second mobile stations and said second mobile communication network.

5. A mobile communication system as claimed in claim 3, wherein each of said adapters comprises switching means for connecting either said radio communicating means or a handset part of said one of the second mobile stations to a radio communication part of said one of the second mobile stations.

6. A mobile communication system as claimed in claim 3, wherein each of said adapters comprises decision means for accepting a registration request signal from at least a predetermined one of the first mobile stations, said registration request signal requesting registration of the first identification data in the first mobile communication network via said one of the second mobile stations and said second mobile communication network.

7. A mobile communication system as claimed in claim 6, wherein each of said adapters comprises dialing means for automatically calling, via said one of the second mobile stations and said second mobile communication network, the first communication network in response to receipt of the registration request signal accepted by said decision means.

8. A mobile communication system as claimed in claim 3, wherein each of said adapters comprises cancellation request means for requesting, via said one of the second mobile stations and said second mobile communication network, that the first identification data registered in the first mobile communication network is canceled in response to receipt of a cancellation request signal from at least a predetermined one of the first mobile stations.

9. A mobile communication system as claimed in claim 3, wherein each of said adapters comprises cancellation request means for periodically determining whether a response is received from at least a predetermined one of the first mobile stations and for requesting, via one of the second mobile stations and said second mobile communication network, that the first identification data registered in the first mobile communication network and related to said at least predetermined one of the first mobile stations is canceled when it is determined that the response is not received from said at least predetermined one of the first mobile stations.

10. A mobile communication system as claimed in claim 1, wherein said first mobile communication network comprises memory means for registering the first identification data in connection with the second mobile stations.

11. A mobile communication system as claimed in claim 1, wherein:
said first mobile communication network comprises a portable telephone network; and
said second mobile communication network comprises an automobile telephone network.

12. A mobile communication system as claimed in claim 1, wherein:
said first mobile stations comprise portable telephones; and
said second mobile stations comprise automobile telephones.

13. A mobile communication system as claimed in claim 1, wherein said first mobile communication network comprises at least one private branch exchange, and at least one radio base station coupled to said first mobile stations via the radio channel.

14. A mobile communication network as claimed in claim 1, wherein said first mobile communication network and said second mobile communication network are connected to each other via a signal line.

15. A radio communication adapter used in a mobile communication system including a first mobile communication network having a controller, first mobile stations registered in the first mobile communication network, a second mobile communication network connected to said first mobile communication network, and second mobile stations registered in the second mobile communication network, said radio communication adapter being attached to said one of the second mobile stations, said radio communication adapter comprising
requesting means for requesting that first identification data of the first mobile stations located outside the first service area is registered, in connection with the second mobile stations, by said controller in said first mobile communication network via said one of the second mobile stations and said second mobile communication network.

16. A radio communication adapter system as claimed in claim 14, wherein said radio communication adapter comprises means for sending second identification data of said one of the second mobile stations to said first mobile communication network via said one of the second mobile stations and said second mobile communication network.

17. A radio communication adapter as claimed in claim 15, wherein said radio communication adapter comprises switching means for connecting either said radio communicating means or a handset part of said one of the second mobile stations to a radio communication part of said one of the second mobile stations.

18. A radio communication adapter as claimed in claim 15, wherein said radio communication adapter comprises decision means for accepting a registration request signal from at least a predetermined one of the first mobile stations, said registration request signal requesting registration of the first identification data in the first mobile communication network via said one of the second mobile stations and said second mobile communication network.

19. A radio communication adapter as claimed in claim 18, wherein said radio communication adapter comprises dialing means for automatically calling, via said one of the second mobile stations and said second mobile communication network, the first communication network in response to receipt of the registration request signal accepted by said decision means.

20. A radio communication adapter as claimed in claim 15, wherein said radio communication adapter comprises cancellation request means for requesting, via said one of the second mobile stations and said second mobile communication network, that the first identification data registered in the first mobile communication network is canceled in response to receipt of a cancellation request signal from at least a predetermined one of the first mobile stations.

21. A radio communication adapter as claimed in claim 15, wherein said radio communication adapter comprises cancellation request means for periodically determining whether a response is received from at least a predetermined one of the first mobile stations and for requesting, via one of the second mobile stations and said second mobile communication network, that the first identification data registered in the first mobile communication network and related to said at least predetermined one of the first mobile stations is canceled when it is determined that the response is not received from said at least predetermined one of the first mobile stations.

22. A radio communication adapter as claimed in claim 15, wherein:
    said first mobile communication network comprises a portable telephone network; and
    said second mobile communication network comprises an automobile telephone network.

23. A radio communication adapter as claimed in claim 15, wherein:
    said first mobile stations comprise portable telephones; and
    said second mobile stations comprise automobile telephones.

24. A mobile communication adapter as claimed in claim 15, wherein said first mobile communication network and said second mobile communication network are connected to each other via a signal line.

* * * * *

UNITED STATES PATENT AND TRADEMARK OFFICE
CERTIFICATE OF CORRECTION

PATENT NO. : 5,335,262
DATED : August 2, 1994
INVENTOR(S) : Takuro OGUCHI et al.

It is certified that error appears in the above-indentified patent and that said Letters Patent is hereby corrected as shown below:

In the Drawings:
Figure 6, LEFTHAND COLUMN, change "HOOK (" to --HOOK--.

Column 14, line 42, change "1!4" to --114--.

Column 18, line 45, change "14," to --15,--.

Signed and Sealed this

Eleventh Day of October, 1994

Attest:

BRUCE LEHMAN

*Attesting Officer*     *Commissioner of Patents and Trademarks*